US012444882B2

(12) United States Patent
Kimura

(10) Patent No.: US 12,444,882 B2
(45) Date of Patent: Oct. 14, 2025

(54) CONNECTOR ASSEMBLY

(71) Applicant: Japan Aviation Electronics Industry, Limited, Tokyo (JP)

(72) Inventor: Akira Kimura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 351 days.

(21) Appl. No.: 18/079,244

(22) Filed: Dec. 12, 2022

(65) Prior Publication Data

US 2023/0283012 A1 Sep. 7, 2023

(30) Foreign Application Priority Data

Mar. 7, 2022 (JP) ................................ 2022-034195

(51) Int. Cl.

| | |
|---|---|
| ***H01R 13/629*** | (2006.01) |
| ***H01R 4/48*** | (2006.01) |
| ***H01R 13/193*** | (2006.01) |
| ***H01R 13/24*** | (2006.01) |
| ***H01R 13/52*** | (2006.01) |

(52) U.S. Cl.

CPC ....... *H01R 13/62938* (2013.01); *H01R 4/489* (2013.01); *H01R 13/193* (2013.01); *H01R 13/2407* (2013.01); *H01R 13/5202* (2013.01)

(58) Field of Classification Search

None

See application file for complete search history.

(56) References Cited

U.S. PATENT DOCUMENTS

| | | | |
|---|---|---|---|
| 2002/0064987 | A1 | 5/2002 | Kimura |
| 2008/0185276 | A1 | 8/2008 | Matsunaga et al. |
| 2021/0159641 | A1 | 5/2021 | Shimizu |

FOREIGN PATENT DOCUMENTS

| | | | |
|---|---|---|---|
| CN | 103633501 | A | 3/2014 |
| JP | 2002170642 | A | 6/2002 |
| JP | 2018152265 | A | 9/2018 |
| JP | 2019067500 | A | 4/2019 |

*Primary Examiner* — Ross N Gushi

(74) *Attorney, Agent, or Firm* — MUNCY, GEISSLER, OLDS & LOWE, P.C.

(57) ABSTRACT

A connector assembly includes a first connector having a first insulator and a first contact, a second connector having a second insulator and a second contact and being fitted to the first connector along a fitting direction; a lever member held by one of the first insulator and the second insulator in a rotatable manner about a rotational axis, a rotational shaft member extending along the rotational axis and rotating in accordance with rotation of the lever member, the rotational shaft member having a cam surface for pressing the first contact and the second contact against each other, and a cam mechanism moving the first insulator and the second insulator relatively along the fitting direction in conjunction with rotation of the lever member.

10 Claims, 32 Drawing Sheets

CONNECTOR ASSEMBLY

BACKGROUND OF THE INVENTION

The present invention relates to a connector assembly, particularly to a connector assembly in which a fitting operation between a first connector and a second connector is performed by rotating a lever member.

Conventionally, there has been known a connector assembly in which a fitting operation between a pair of connectors is easily performed using rotation of a lever member. As an example, JP 2018-152265 A discloses a connector assembly comprising a first connector 1 and a second connector 2 that is fitted to the first connector 1 along a fitting direction D1, as shown in FIG. 55. A first housing 1A of the first connector 1 is provided with a projection 1B projecting in a direction orthogonal to the fitting direction D, and a second housing 2A of the second connector 2 has a lever member 3 rotatably attached to an outer side of the second housing 2A with a rotation fulcrum portion 2B serving as a fulcrum point.

In the lever member 3, a guide groove (not shown) is formed to face an outer surface of the second housing 2A. The second connector 2 is brought to the vicinity of the first connector 1 along the fitting direction D, the projection 1B of the first connector 1 is inserted in the guide groove of the lever member 3, and in this state, the lever member 3 is rotated, whereby the first connector 1 and the second connector 2 are fitted to each other.

As a result of fitting between the first connector 1 and the second connector 2, as shown in FIG. 56, a first contact 1C disposed in the first housing 1A is electrically connected to a second contact 2D inserted in a contact insertion port 2C of the second connector 2.

The second contact 2D is connected to a tip end of an electric wire 4, and, for example, when the first connector 1 is mounted on an electrical device (not shown), an electric current can be applied to the electrical device through the electric wire 4.

In a case where an electric current is applied to an electrical device using the connector assembly of this type, the higher the electric current is, the thicker the electric wire 4 connected to the second contact 2D needs to be.

However, if the electrical device is mounted on a vehicle or installed in an environment where the electrical device receives an external force such as vibration, the external force would be transmitted to a contacting part between the first contact 1C and the second contact 2D through the thick electric wire 4, causing a contact failure therebetween.

An increase in the contact force between the first contact 1C and the second contact 2D could improve their contact reliability but would require the higher insertion force for fitting the first connector 1 with the second connector 2, and accordingly, it may become difficult to easily perform a fitting operation between the first connector 1 and the second connector 2 even with use of rotation of the lever member 3. Moreover, an increase in the contact force may also cause damage on surfaces of the first contact 1C and the second contact 2D, and the contact reliability may be lowered.

SUMMARY OF THE INVENTION

The present invention has been made to overcome the above problems associated with the prior art and aims at providing a connector assembly that can improve the contact reliability between a first contact and a second contact while a first connector and a second connector are easily fitted to each other.

A connector assembly according to the present invention comprises:

a first connector including a first insulator and a first contact, the first contact being held by the first insulator;

a second connector including a second insulator and a second contact and being fitted to the first connector along a fitting direction, the second contact being held by the second insulator;

a lever member held by one of the first insulator and the second insulator in a rotatable manner about a rotational axis:

a rotational shaft member extending along the rotational axis and rotating in accordance with rotation of the lever member, the rotational shaft member including a cam surface for pressing the first contact and the second contact against each other; and a cam mechanism moving the first insulator and the second insulator relatively along the fitting direction in conjunction with rotation of the lever member, wherein, when the lever member is rotated from an initial rotation position to a first rotation position with the second insulator being situated at a start-of-fitting position with respect to the first insulator, the cam mechanism moves the second insulator to a fitting position along the fitting direction, and when the lever member is further rotated from the first rotation position to a second rotation position, the first contact and the second contact are brought into contact with each other with a predetermined contact pressure due to the cam surface of the rotational shaft member while the second insulator is kept at the fitting position.

DETAILED DESCRIPTION OF THE INVENTION

Embodiments of the present invention are described below with reference to the accompanying drawings.

Embodiment 1

Figure 1:
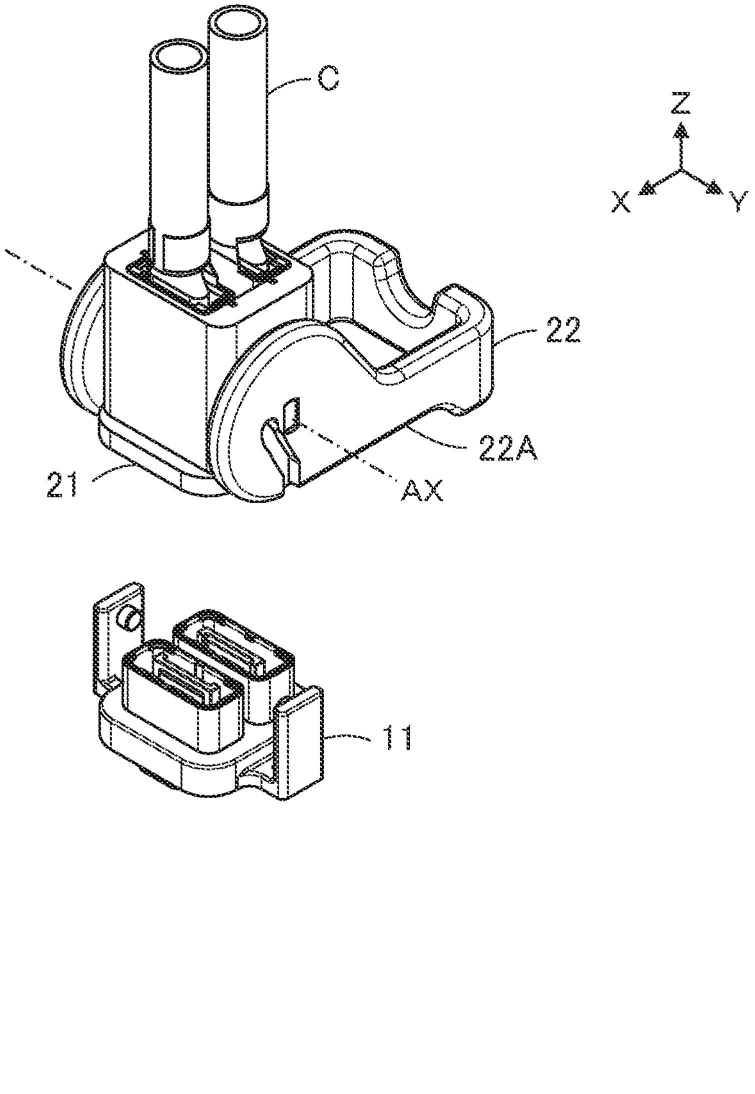
FIG. 1 is a perspective view showing a connector assembly according to Embodiment 1 in the non-fitted state.

FIG. 1 shows a connector assembly according to Embodiment 1 in the non-fitted state. The connector assembly includes a first connector 11 and a second connector 21 that is fitted to the first connector 11 along a fitting direction. For instance, with the first connector 11 being mounted on an electrical device (not shown) and the second connector 21 being attached to end portions of two electric wires C, the connector assembly can detachably connect the two electric wires C to the electrical device.

Fitting and detaching operations of the first connector 11 and the second connector 21 can be performed by operating a lever member 22 that is attached to the second connector 21 in a rotatable manner about a rotational axis AX.

For convenience, the direction of fitting between the first connector 11 and the second connector 21 is referred to as "Z direction," the direction in which the rotational axis AX of the lever member 22 extends as "Y direction," and the direction orthogonal to the Z direction and the Y direction as "X direction."

The second connector 21 moves from the +Z direction to the −Z direction to be fitted to the first connector 11.

Figure 2:
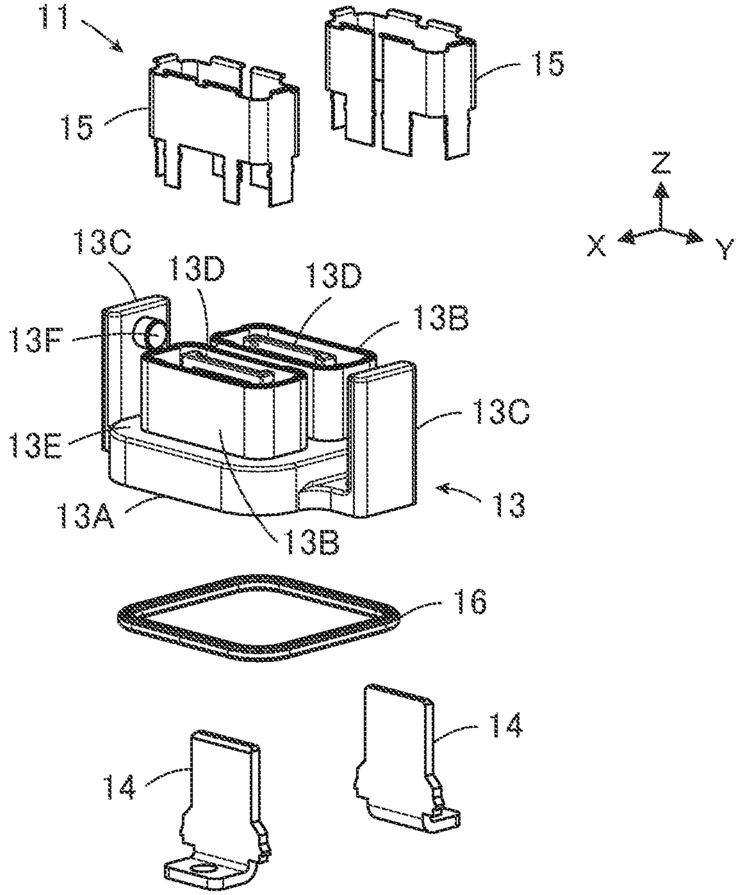
FIG. 2 is an exploded perspective view of a first connector used in Embodiment 1.

FIG. 2 shows an exploded perspective view of the first connector 11. The first connector 11 includes a first insulator 13, and a pair of first contacts 14 each held by the first insulator 13 and extending along the Z direction.

The first insulator 13 includes a base portion 13A of flat plate shape extending along an XY plane, a pair of protruding portions 13B protruding in the +Z direction from a +Z directional surface of the base portion 13A and adjoining each other in the X direction, and a pair of support portions 13C of flat plate shape separately joined to a +Y directional end portion and a −Y directional end portion of the base portion 13A and extending in the +Z direction while facing each other in the Y direction.

Each of the pair of protruding portions 13B is provided with a second contact housing portion 13D of recess shape opened toward the +Z direction and extending in the Z direction. Of the +Z directional surface of the base portion 13A, a portion around the pair of protruding portions 13B constitutes an abutment surface 13E which contacts the second connector 21 when the first connector 11 and the second connector 21 are fitted with each other.

A pair of pins 13F projecting in the Y direction are separately formed on surfaces of the pair of support portions 13C, the surfaces facing each other. While FIG. 2 shows only the pin 13F formed in the support portion 13C on the −Y direction side, the support portion 13C on the +Y direction side is also provided with a like pin 13F. The two pins 13F are arranged in a straight line along the Y direction.

The first connector 11 also includes a pair of shells 15 separately fixed to inner surfaces of the pair of second contact housing portions 13D of the first insulator 13, and a waterproof packing 16 disposed on the −Z directional surface of the base portion 13A of the first insulator 13.

Figure 3:
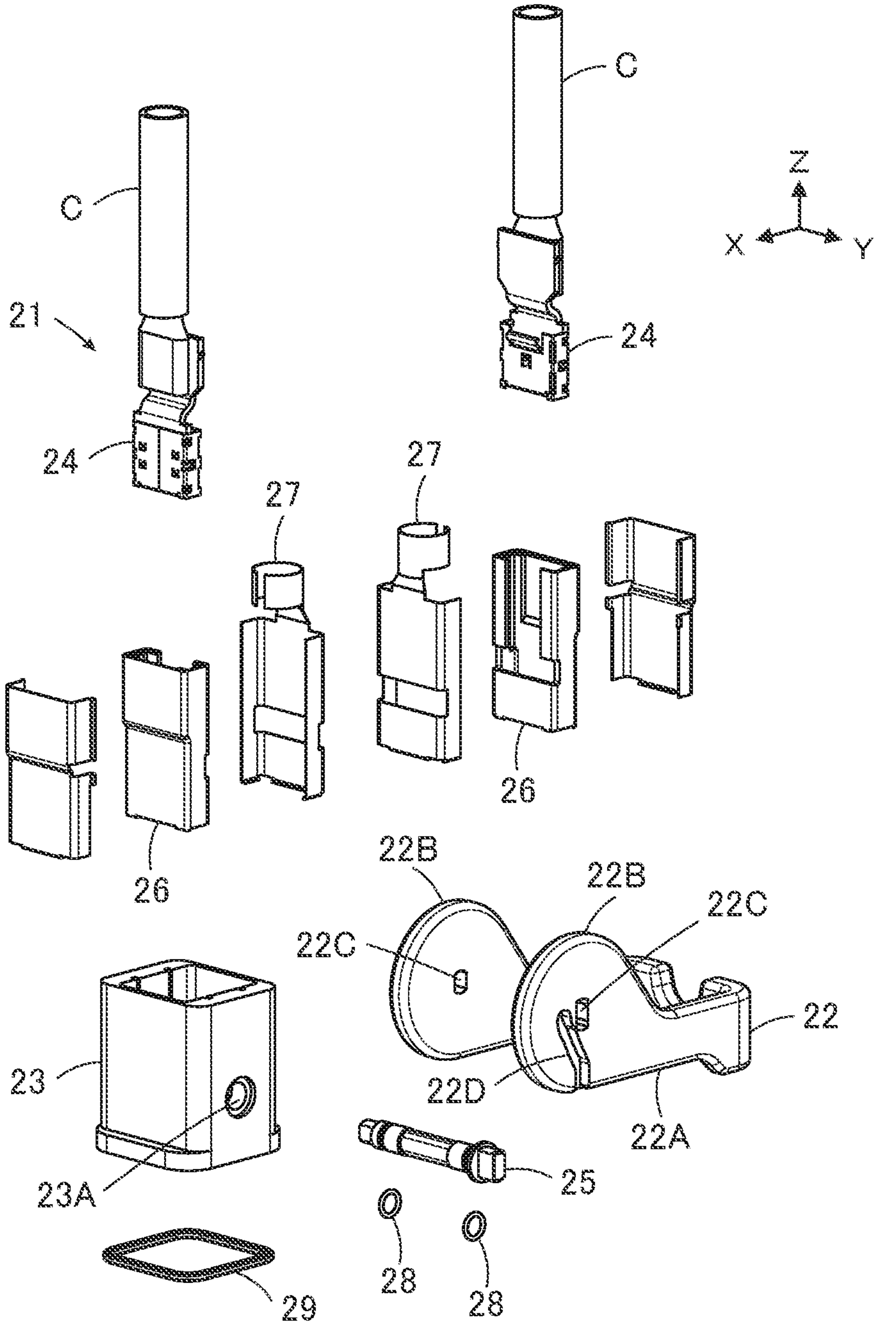
FIG. 3 is an exploded perspective view of a second connector used in Embodiment 1.

FIG. 3 shows an exploded perspective view of the second connector 21. The second connector 21 includes a second insulator 23 of tubular shape, a rotational shaft member 25 that penetrates the second insulator 23 in the Y direction and is rotatably attached to the second insulator 23, the lever member 22 that is fixed to the rotational shaft member 25, and a pair of second contacts 24 that are separately connected to end portions of the two electric wires C.

The second connector 21 also includes a pair of inner insulators 26 that separately house the pair of second contacts 24, and two sets of shells 27 that separately surround the pair of inner insulators 26.

Each of the pair of second contacts 24 is housed in the inner insulator 26 and is held inside the second insulator 23 while being also surrounded by the shell 27.

In addition, a pair of through holes 23A are separately formed in opposite side portions of the second insulator 23 and serve as rotational-shaft-member housing portions through which the rotational shaft member 25 is passed and which separately house opposite end portions of the rotational shaft member 25. While FIG. 3 shows only the through hole 23A formed in the +Y directional side portion of the second insulator 23, the −Y directional side portion of the second insulator 23 is also provided with a like through hole 23A. The two through holes 23A are arranged in a straight line along the Y direction.

The lever member 22 includes a handle portion 22A bent into a U-shape, and a pair of circular plate portions 22B separately joined to opposite ends of the handle portion 22A so as to face each other in the Y direction and each extending along an XZ plane. The pair of circular plate portions 22B are separately provided with center holes 22C. The opposite end portions of the rotational shaft member 25 passing through the pair of through holes 23A of the second insulator 23 are separately jointed to the center holes 22C, whereby the lever member 22 is held in a rotatable manner with respect to the second insulator 23.

In addition, cam grooves 22D are separately formed on outer surfaces of the pair of circular plate portions 22B, the outer surfaces facing in opposite directions from each other. While FIG. 3 shows only the cam groove 22D formed in the circular plate portion 22B on the +Y direction side, the circular plate portion 22B on the −Y direction side is also provided with a like cam groove 22D.

The pair of pins 13F of the first insulator 13 are separately inserted into the cam grooves 22D of the pair of circular plate portions 22B, and the cam grooves 22D and the pins 13F constitute a cam mechanism that relatively moves the first insulator 13 and the second insulator 23 along the Z direction in conjunction with rotation of the lever member 22.

In addition, the second connector 21 includes a pair of rotational-axis waterproof packings 28 which separately surround the opposite end portions of the rotational shaft member 25 along an XZ plane and each of which seals between an inner surface of each of the pair of through holes 23A of the second insulator 23 and an outer peripheral surface of each of the opposite end portions of the rotational shaft member 25, and a fitting-part waterproof packing 29 which is disposed on the −Z directional front end surface of the second insulator 23 and which seals between the abutment surface 13E of the first insulator 13 and the −Z directional front end surface of the second insulator 23 when the first connector 11 and the second connector 21 are fitted with each other.

Figure 4:
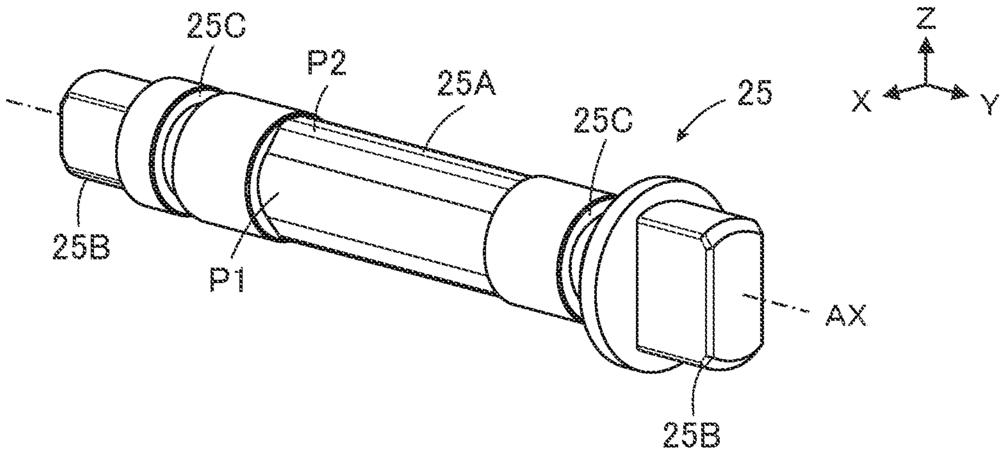
FIG. 4 is a perspective view showing a rotational shaft member used in Embodiment 1.

As shown in FIG. 4, the rotational shaft member 25 extends in the Y direction along the rotational axis AX, a cam portion 25A is formed at a center part in the Y direction of the rotational shaft member 25, and a pair of fitting portions 25B extending in the Y direction are separately formed at Y directional opposite ends of the rotational shaft member 25. In addition, a pair of packing holding grooves 25C of annular shape are each formed between the cam portion 25A and one of the pair of fitting portions 25B at the outer periphery of the rotational shaft member 25 along an XZ plane.

The pair of fitting portions 25B are joined to the lever member 22 by being each inserted into the center hole 22C of the corresponding circular plate portion 22B of the lever member 22. Moreover, the pair of rotational-axis waterproof packings 28 are separately fitted into the pair of packing holding grooves 25C of annular shape to be thereby held by the rotational shaft member 25.

Figure 5:
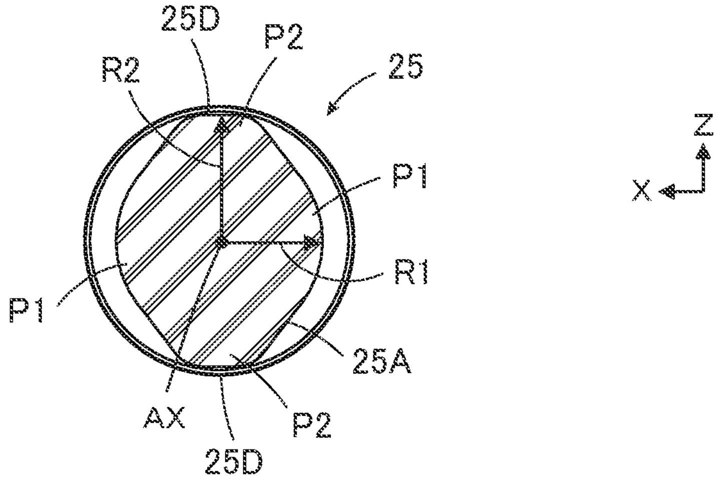
FIG. 5 is a cross-sectional view showing the rotational shaft member used in Embodiment 1.

As shown in FIG. 5, the cam portion 25A has a sectional shape similar to an elliptical shape having a short radius and a long radius, and along a circumference of the cam portion 25A, two small radius portions P1 with a relatively small radius R1 from the rotational axis AX and two large radius portions P2 with a relatively large radius R2 from the rotational axis AX are adjacently and alternately disposed at 90 degree intervals along the circumferential direction. A surface of the large radius portion P2 constitutes an outer peripheral cam surface 25D.

Next, the fitting operation between the first connector 11 and the second connector 21 will be described.

As shown in FIG. 1, the rotation angle of the lever member 22 with the handle portion 22A extending in the Y direction is defined as "zero degrees," and this rotation position of the lever member 22 is defined as "initial rotation position." The lever member 22 is rotatably attached to the second connector 21 such that the rotation angle can be changed from zero degrees to 90 degrees.

Figure 6:
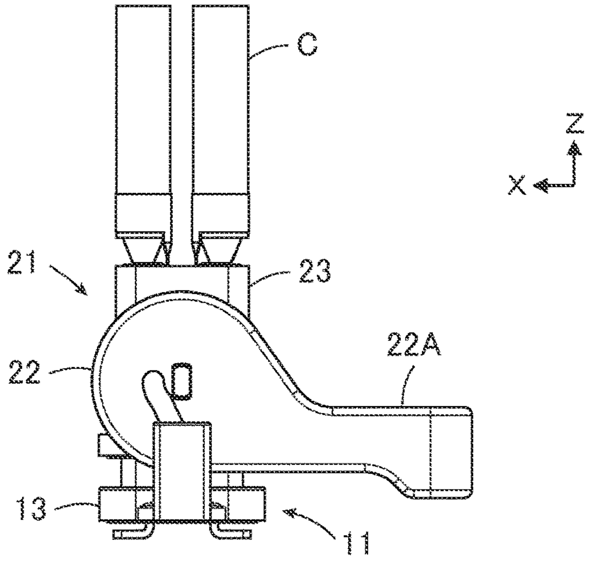
FIG. 6 is a side view showing the connector assembly according to Embodiment 1 when the rotation angle of a lever member in a fitting operation is zero degrees.

First, with the lever member 22 having the rotation angle of zero degrees, the second connector 21 is moved from the +Z direction to the −Z direction toward the first connector 11, whereby a +Z directional portion of the first insulator 13 of the first connector 11 is inserted in the second insulator 23 of the second connector 21 as shown in FIG. 6.

Figure 7:
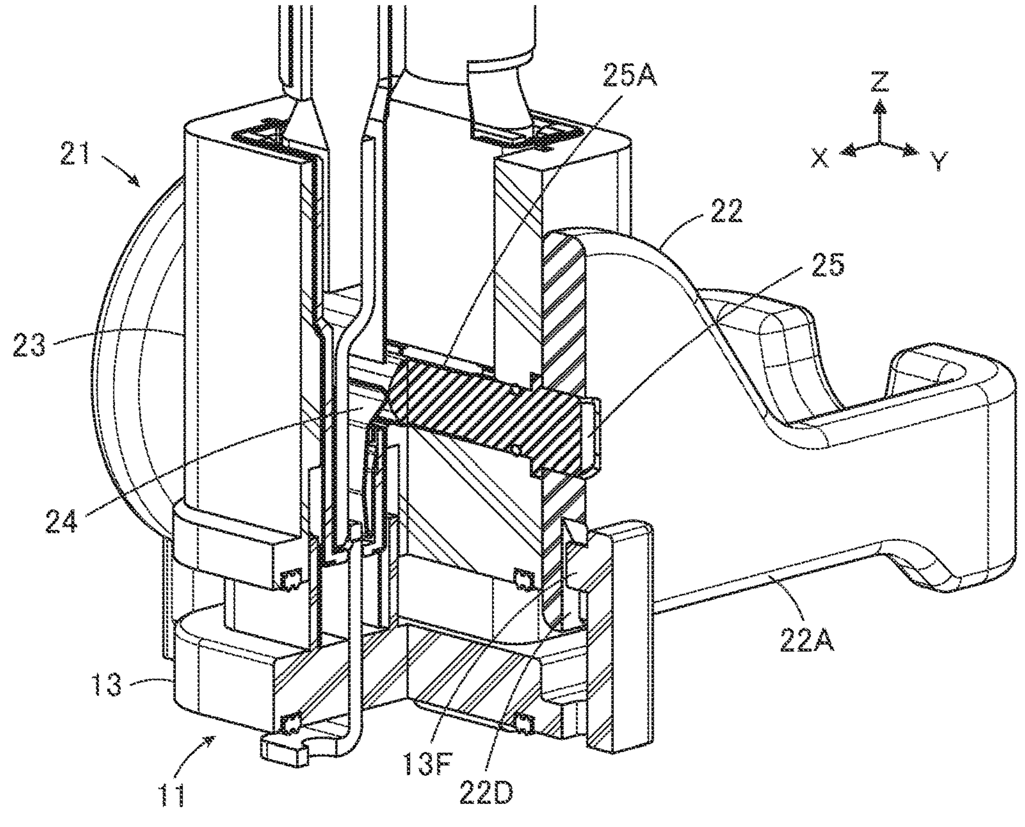
FIG. 7 is a partially broken perspective view showing the connector assembly according to Embodiment 1 when the rotation angle of the lever member in the fitting operation is zero degrees.

Consequently, as shown in FIG. 7, the pin 13F of the first insulator 13 of the first connector 11 is inserted to an entrance of the cam groove 22D of the lever member 22 attached to the second connector 21, and the second insulator 23 is situated at a start-of-fitting position with respect to the first insulator 13.

In the second connector 21, the second contact 24 held inside the second insulator 23 is situated at the same Y directional position as that of the cam portion 25A formed at the center part of the rotational shaft member 25 penetrating the second insulator 23 in the Y direction.

Figure 8:
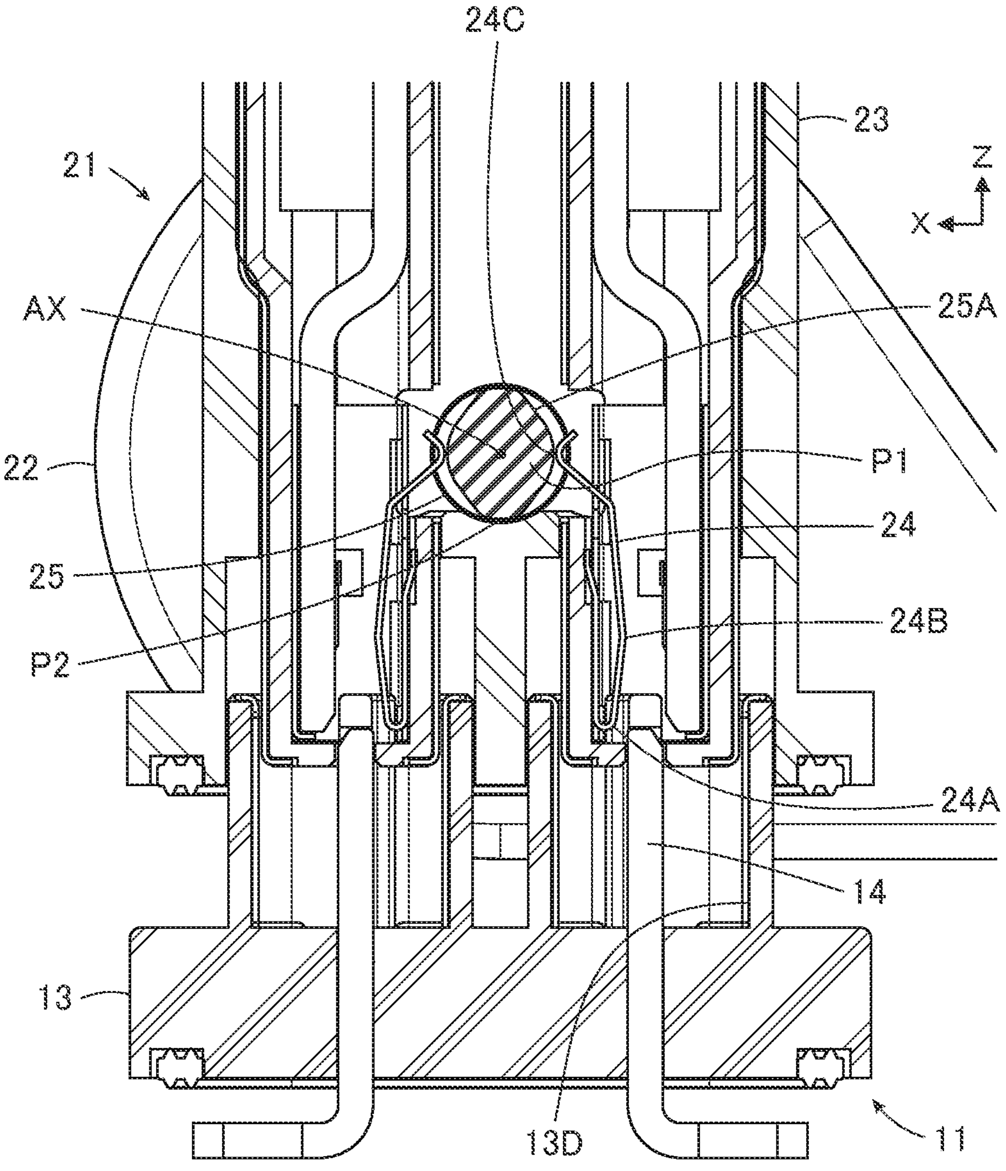
FIG. 8 is a partial cross-sectional view showing the connector assembly according to Embodiment 1 when the rotation angle of the lever member in the fitting operation is zero degrees.

As shown in FIG. 8, the second contact 24 is composed of a spring contact bent into a U-shape, and includes a fulcrum portion 24A formed at a bent portion of U-shape, a contact point portion 24B situated on the +Z direction side of the fulcrum portion 24A, and a point-of-effort portion 24C situated on the +Z direction side of the contact point portion 24B and forming a free end.

The point-of-effort portion 24C of the second contact 24 is situated at the same Z directional position as that of the rotational axis AX of the rotational shaft member 25 and faces the cam portion 25A of the rotational shaft member 25, and the rotational shaft member 25 is jointed to the lever member 22 such that when the rotation angle of the lever member 22 is zero degrees, the small radius portion P1 of the cam portion 25A of the rotational shaft member 25 faces in the X direction while the large radius portion P2 faces in the Y direction. Accordingly, the point-of-effort portion 24C of the second contact 24 faces the small radius portion P1 of the rotational shaft member 25, and due to the relatively small radius R1 of the small radius portion P1, the point-of-effort portion 24C is not in contact with the rotational shaft member 25 in FIG. 8.

In this state, while the second contact 24 held inside the second insulator 23 is inserted to a middle position of the interior in the Z direction of the second contact housing portion 13D of the first connector 11, the contact point portion 24B of second contact 24 has not reached the position to face the first contact 14 of the first connector 11 yet.

Figure 9:
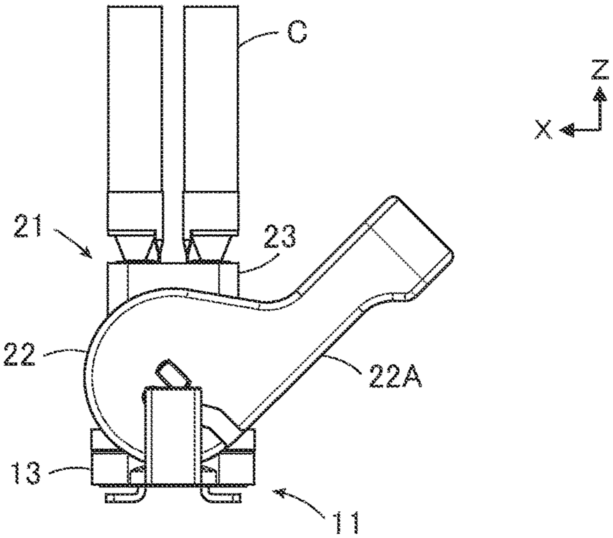
FIG. 9 is a side view showing the connector assembly according to Embodiment 1 when the rotation angle of the lever member in the fitting operation is 45 degrees.
Figure 10:
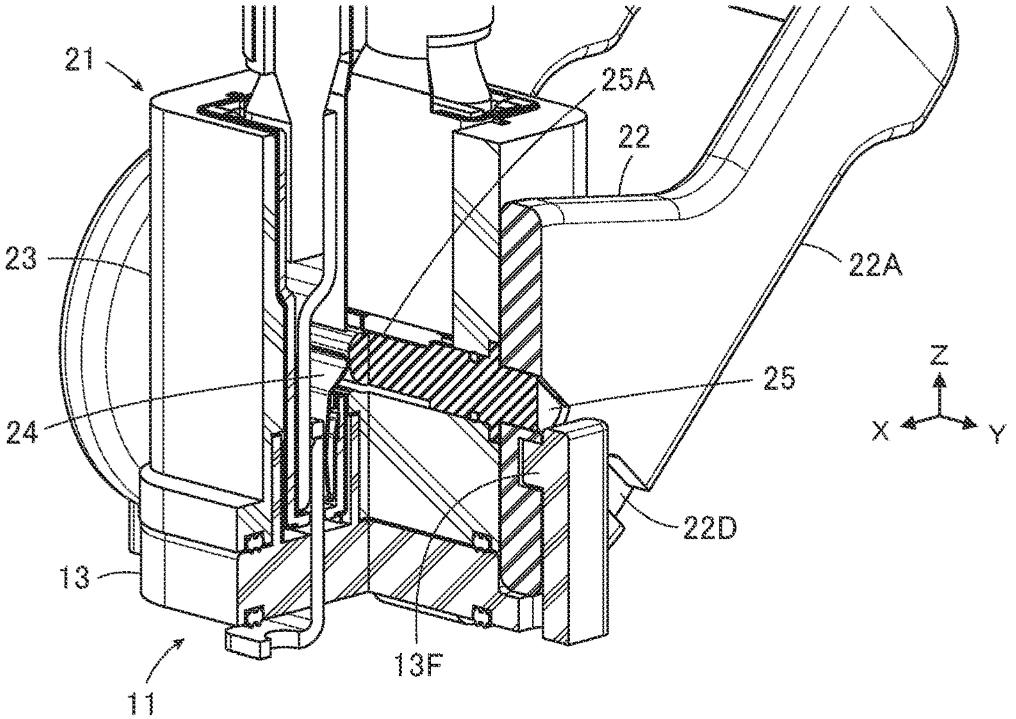
FIG. 10 is partially broken perspective view showing the connector assembly according to Embodiment 1 when the rotation angle of the lever member in the fitting operation is 45 degrees.

Next, as shown in FIG. 9, when the lever member 22 is rotated till the handle portion 22A is positioned at 45 degrees to the Y direction, as shown in FIG. 10, the pin 13F of the first insulator 13 of the first connector 11 relatively advances along the cam groove 22D of the lever member 22, and the second insulator 23 of the second connector 21 moves in the −Z direction with respect to the first insulator 13 of the first connector 11.

Figure 11:
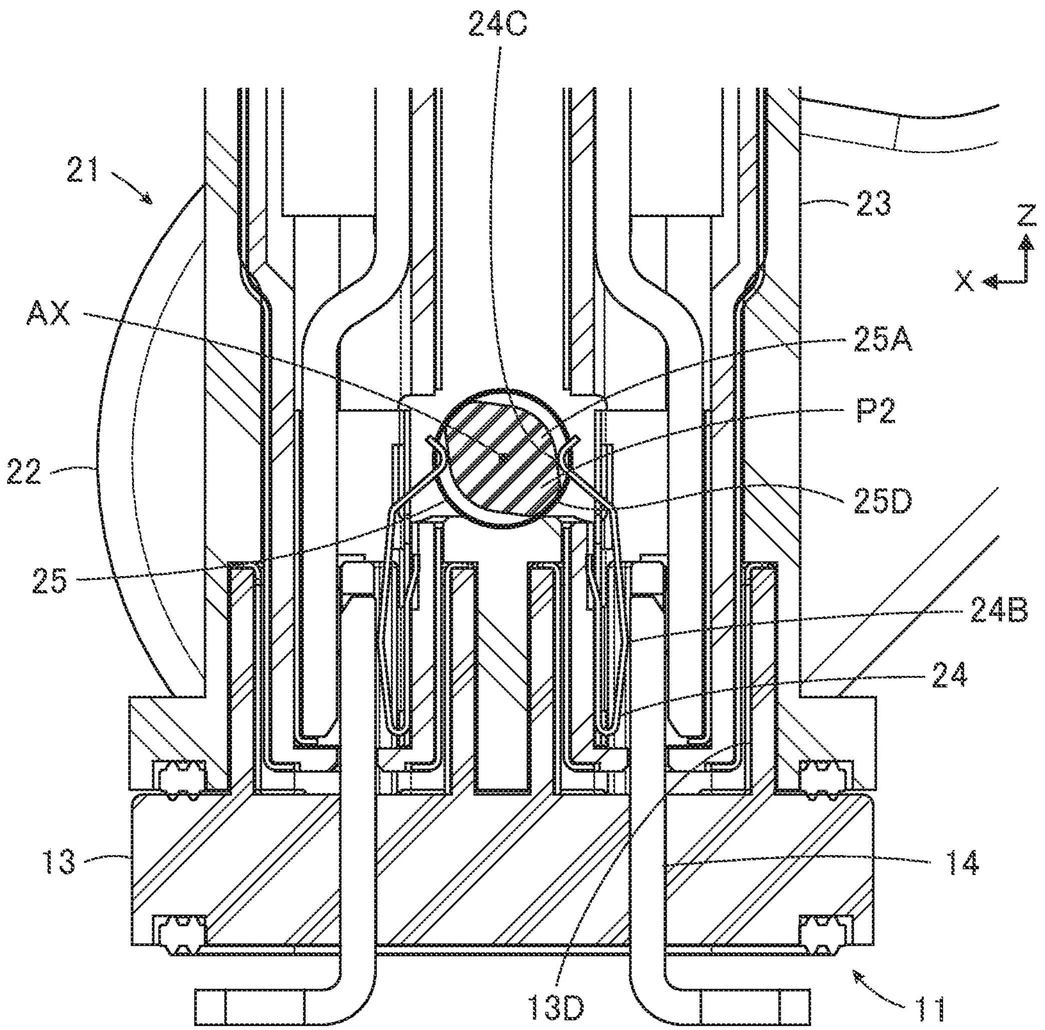
FIG. 11 is a partial cross-sectional view showing the connector assembly according to Embodiment 1 when the rotation angle of the lever member in the fitting operation is 45 degrees.

Consequently, the contact point portion 24B of the second contact 24 is situated to face a side surface of the first contact 14 of the first connector 11 as shown in FIG. 11. In this state, the Z directional position of the second insulator 23 with respect to the first insulator 13 is defined as "fitting position," and the rotation position of the lever member 22 is defined as "first rotation position."

At this time, in accordance with rotation of the lever member 22, the rotational shaft member 25 also rotates 45 degrees about the rotational axis AX, while the outer peripheral cam surface 25D formed in a surface of the large radius portion P2 has not faced in the X direction yet, and the point-of-effort portion 24C of the second contact 24 is kept in a non-contact state with the rotational shaft member 25.

Figure 12:
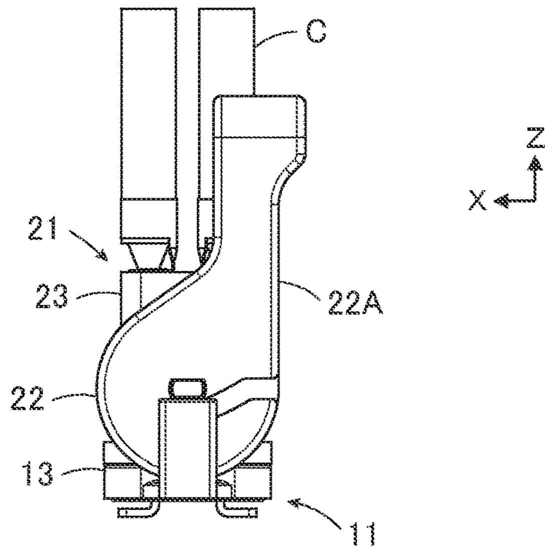
FIG. 12 is a side view showing the connector assembly according to Embodiment 1 when the rotation angle of the lever member in the fitting operation is 90 degrees.
Figure 13:
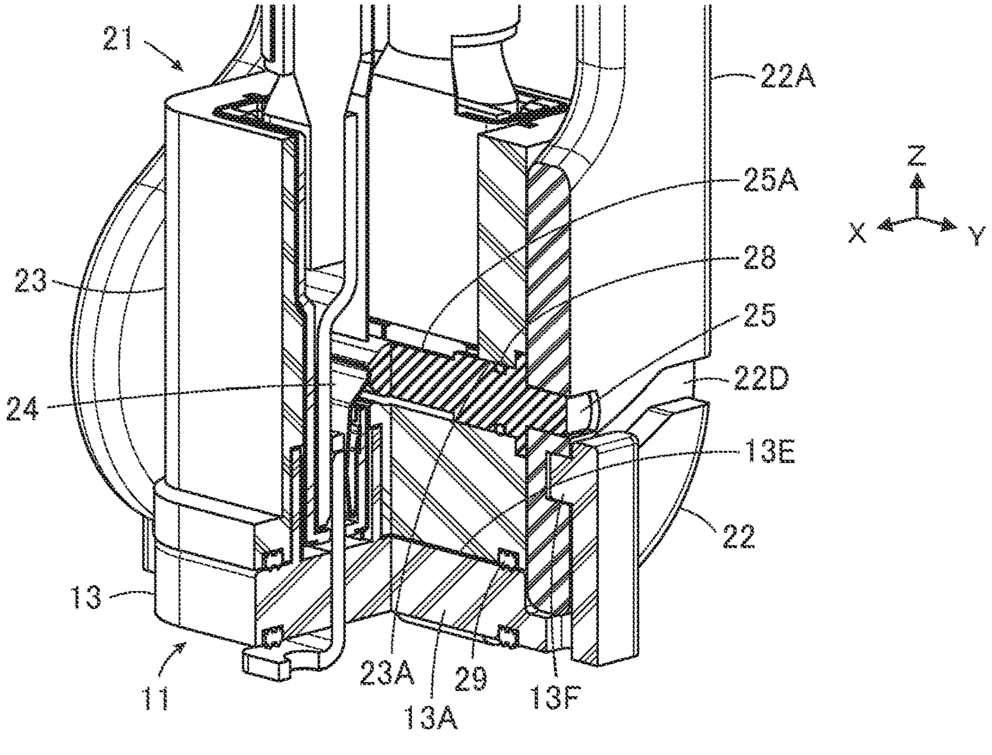
FIG. 13 is a partially broken perspective view showing the connector assembly according to Embodiment 1 when the rotation angle of the lever member in the fitting operation is 90 degrees.

As shown in FIG. 12, when the lever member 22 in this state is rotated till the handle portion 22A is positioned at 90 degrees to the Y direction, as shown in FIG. 13, the pin 13F of the first insulator 13 of the first connector 11 is inserted to the deepest part of the cam groove 22D of the lever member 22, while the Z directional position of the second insulator 23 with respect to the first insulator 13 does not change due to the shape of the cam groove 22D.

Figure 14:
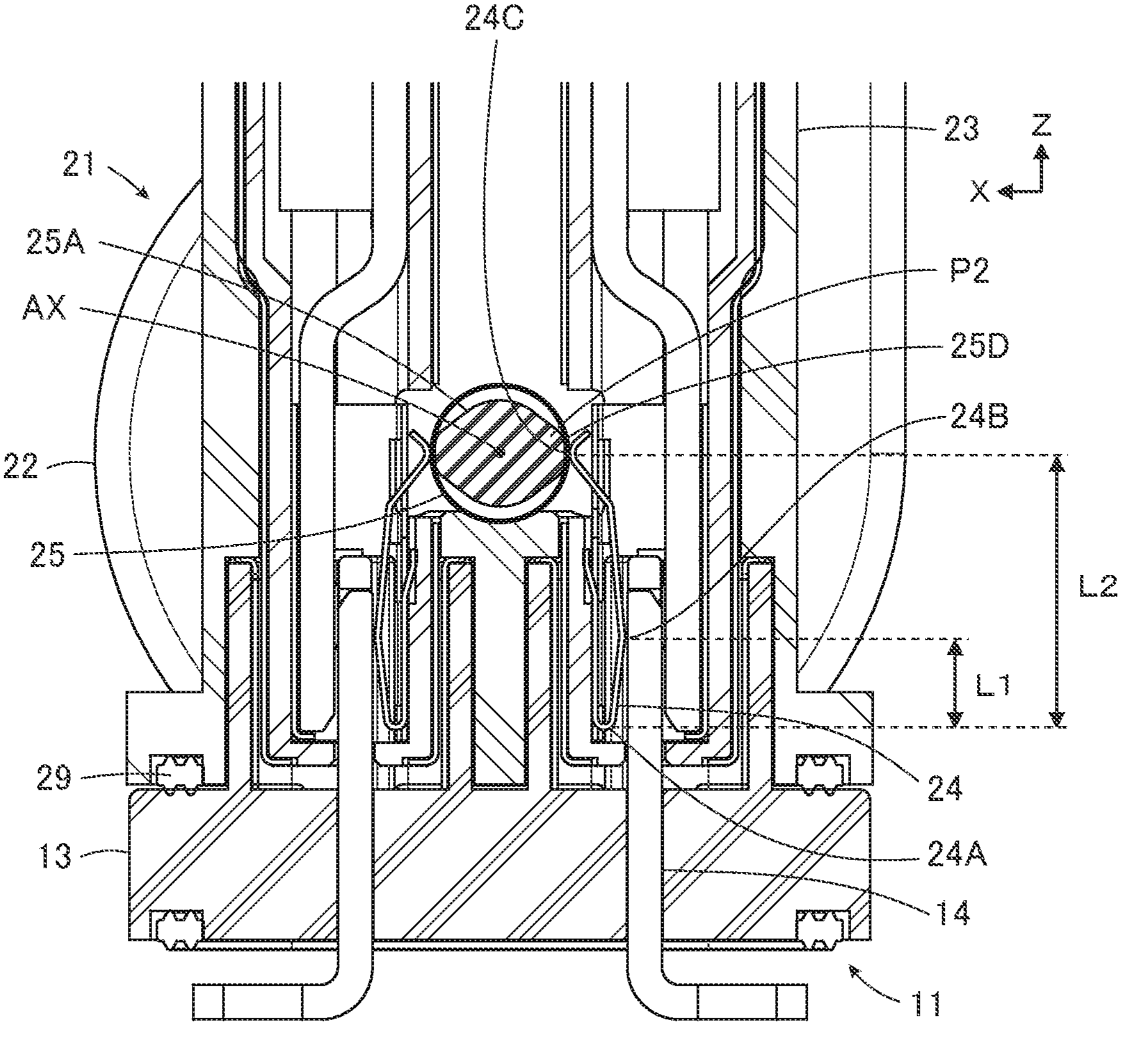
FIG. 14 is a partial cross-sectional view showing the connector assembly according to Embodiment 1 when the rotation angle of the lever member in the fitting operation is 90 degrees.

Accordingly, as shown in FIG. 14, the second insulator 23 of the second connector 21 is kept to be held at the fitting position with respect to the first insulator 13 of the first connector 11, and the contact point portion 24B of the second contact 24 is kept to face the side surface of the first contact 14 of the first connector 11.

Meanwhile, in accordance with rotation of the lever member 22, the rotational shaft member 25 also rotates about the rotational axis AX, and the outer peripheral cam surface 25D formed in the surface of the large radius portion P2 faces in the X direction. Since the large radius portion P2 has the relatively large radius R2, the outer peripheral cam surface 25D contacts and presses the point-of-effort portion 24C of the second contact 24 in the X direction.

Since a distance L2 from the fulcrum portion 24A to the point-of-effort portion 24C in the second contact 24 is designed to be longer than a distance L1 from the fulcrum portion 24A to the contact point portion 24B, the so-called principle of leverage works such that the contact point portion 24B receives a force larger than a pressing force the point-of-effort portion 24C receives from the outer peripheral cam surface 25D of the rotational shaft member 25, whereby the contact point portion 24B of the second contact 24 contacts the first contact 14 with a high contact pressure.

The rotation position of the lever member 22 at this time is defined as "second rotation position."

As described above, by rotating the lever member 22 from the initial rotation position where the handle portion 22A has an angle of zero degrees with respect to the Y direction to the first rotation position where the handle portion 22A has an angle of 45 degrees with respect to the Y direction, the second insulator 23 of the second connector 21 can be moved from the start-of-fitting position to the fitting position with respect to the first insulator 13 of the first connector 11 while the point-of-effort portion 24C of the second contact 24 is not in contact with the rotational shaft member 25, and the first connector 11 and the second connector 21 can be easily fitted to each other with a small insertion force.

Further, by rotating the lever member 22 from the first rotation position to the second rotation position where the handle portion 22A has an angle of 90 degrees with respect to the Y direction, then, the point-of-effort portion 24C of the second contact 24 is pressed in the X direction by the outer peripheral cam surface 25D of the rotational shaft member 25 while the second insulator 23 of the second connector 21 is kept at the fitting position with respect to the first insulator 13 of the first connector 11, and the contact point portion 24B of the second contact 24 can be brought into contact with the first contact 14 with a high contact pressure.

At this time, since the first contact 14 and the second contact 24 are pressed against each other in the X direction without rubbing against each other in the Z direction, the first contact 14 and the second contact 24 can be electrically connected to each other while preventing surface damages thereof.

Hence, even if the first connector 11 is mounted on an electrical device that is installed in an environment where the electrical device receives an external force such as vibration, the first connector 11 and the second connector 21 are easily fitted to each other while the first contact 14 and the second contact 24 contact each other with a high contact pressure, thereby enabling to achieve reliable electrical connection therebetween.

In addition, as shown in FIG. 13, when the second insulator 23 of the second connector 21 is situated at the fitting position with respect to the first insulator 13 of the first connector 11, the fitting-part waterproof packing 29 disposed on the −Z directional front end surface of the second insulator 23 is pressed against the abutment surface 13E of the base portion 13A of the first insulator 13 to thereby seal between the front end surface of the second insulator 23 and the abutment surface 13E.

Moreover, due to the presence of the rotational-axis waterproof packings 28 separately attached to the Y directional opposite end portions of the rotational shaft member 25, a portion between the inner surface of each of the through holes 23A of the first insulator 23 and the outer peripheral surface of the rotational shaft member 25 is sealed.

Accordingly, the connection parts between the first contact 14 and the second contact 24 can be prevented from water infiltration from the outside.

Embodiment 2

Figure 15:
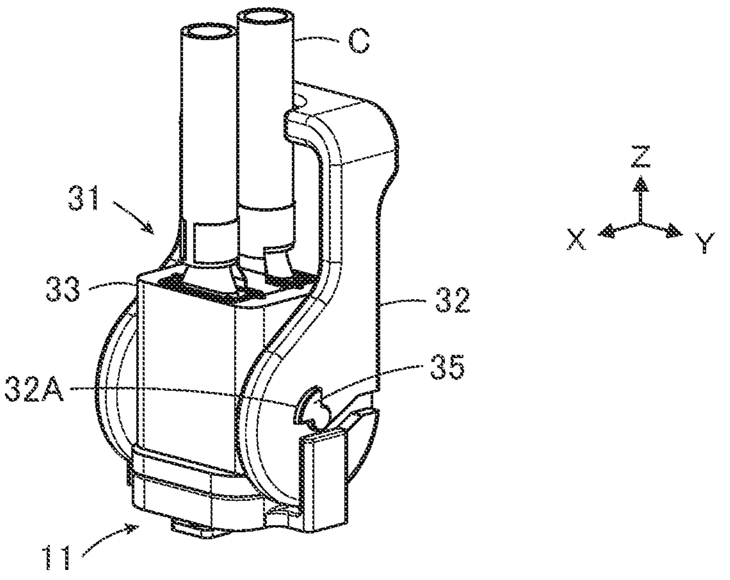
FIG. 15 is a perspective view showing a connector assembly according to Embodiment 2 in the fitted state.

FIG. 15 shows a connector assembly according to Embodiment 2 in the fitted state. The connector assembly is configured such that in the connector assembly according to Embodiment 1, a second connector 31 in place of the second connector 21 is fitted with the first connector 11.

The second connector 31 includes a second insulator 33, a rotational shaft member 35, and a lever member 32, and the rotational shaft member 35 is held to be slidable in the Y direction with respect to the second insulator 33. As with Embodiment 1, a pair of second contacts separately connected to end portions of the two electric wires C are held inside the second insulator 33.

Figure 16:
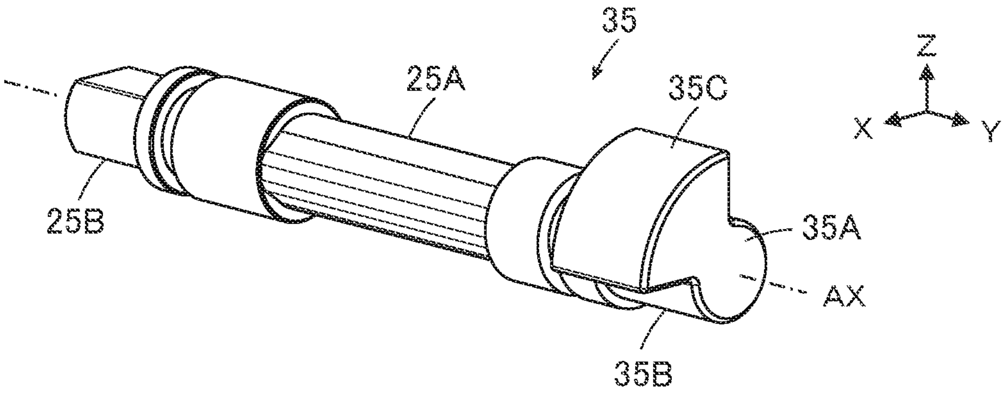
FIG. 16 is a perspective view showing a rotational shaft member used in Embodiment 2.

As shown in FIG. 16, the rotational shaft member 35 corresponds to the rotational shaft member 25 in Embodiment 1 having, in place of the fitting portion 25B, a fitting portion 35A formed at the +Y directional end portion thereof, and otherwise has a similar configuration to that of the rotational shaft member 25 in Embodiment 1.

The fitting portion 35A of the rotational shaft member 35 includes a columnar portion 35B projecting in the +Y direction along the rotational axis AX, and a projection 35C integrally joined to an outer periphery of the columnar portion 35B and projecting in the radial direction to have a fan-like shape when viewed from the Y direction.

Figure 17:
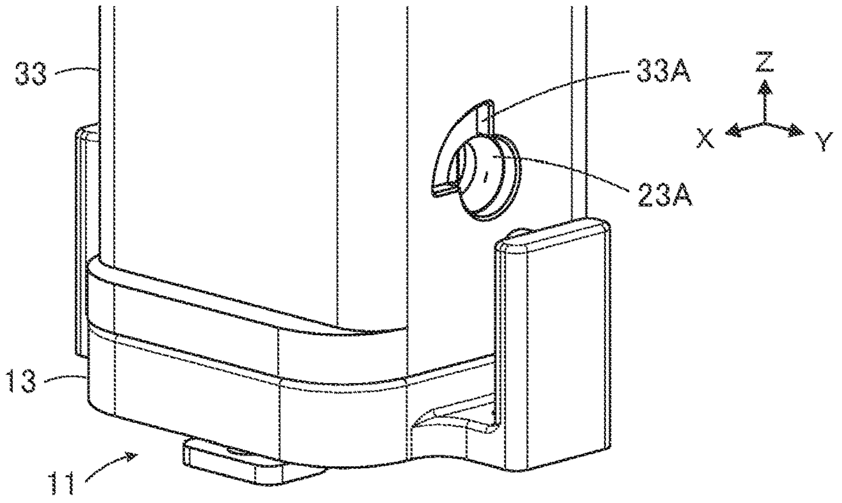
FIG. 17 is a partial perspective view showing the connector assembly according to Embodiment 2 with a lever member being omitted.

As shown in FIG. 17, the second insulator 33 has a similar configuration to that of the second insulator 23 in Embodiment 1 except that a projection housing portion 33A communicating with the through hole 23A and opened toward the +Y direction is formed in the +Y directional side portion of the second insulator 33.

The projection housing portion 33A has a shape corresponding to the projection 35C of the fitting portion 35A of the rotational shaft member 35 when viewed from the Y direction.

As shown in FIG. 15, the lever member 32 corresponds to the lever member 22 in Embodiment 1 having, in place of the center hole 22C, a center hole 32A provided in the circular plate portion 22B on the +Y direction side, and otherwise has a similar configuration to that of the lever member 22 in Embodiment 1.

The center hole 32A of the lever member 32 has a shape corresponding to the fitting portion 35A of the rotational shaft member 35 when viewed from the Y direction, that is, a shape in which a projection is formed at and protrudes from an outer periphery of a columnar portion.

Figure 18:
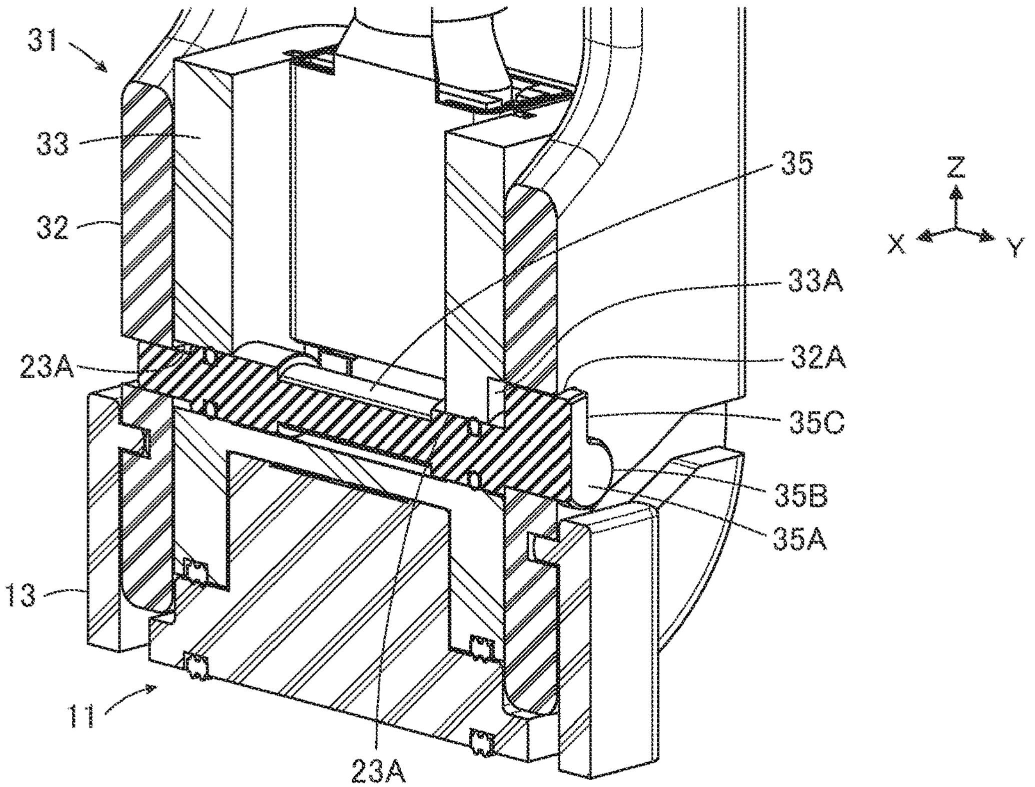
FIG. 18 is a partially broken perspective view showing the connector assembly according to Embodiment 2 in the fitted state.

As shown in FIG. 18, the rotational shaft member 35 is held by the second insulator 33 while passing through the pair of through holes 23A of the second insulator 33, with the fitting portion 35A formed at the +Y directional end portion of the rotational shaft member 35 being inserted in the center hole 32A of the lever member 32. Since the center hole 32A of the lever member 32 has a shape corresponding to the fitting portion 35A of the rotational shaft member 35, once the fitting portion 35A is inserted in the center hole 32A, the lever member 32 cannot be rotated with respect to the rotational shaft member 35.

In the fitting operation between the first connector 11 and the second connector 31, the rotational shaft member 35 is slid in the +Y direction in the pair of through holes 23A of the second insulator 33 and the center hole 32A of the lever member 32, so that the projection 35C of the fitting portion 35A is situated on the +Y direction side of the projection housing portion 33A of the second insulator 33. Accordingly, the lever member 32 and the rotational shaft member 35 can be rotated with respect to the second insulator 33 without interference between the projection 35C of the fitting portion 35A and the projection housing portion 33A of the second insulator 33.

In this manner, as with Embodiment 1, while the first connector 11 and the second connector 31 are easily fitted to each other, the first contact and the second contact are brought into contact with each other with a high contact pressure, thereby enabling to achieve reliable electrical connection therebetween.

Figure 19:
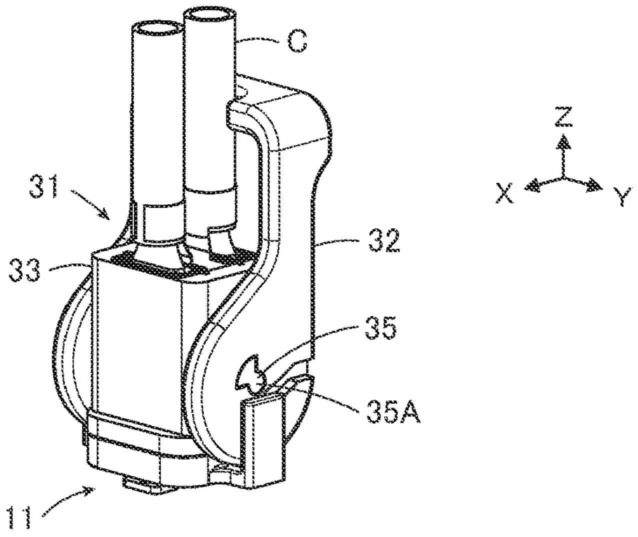
FIG. 19 is a perspective view showing the connector assembly according to Embodiment 2 with rotation of the lever member being locked.

When the first connector 11 and the second contact 31 are fitted with each other, and electrical connection between the first contact and the second contact is established, as shown in FIG. 19, the rotational shaft member 35 is slid in the −Y direction with respect to the lever member 32 and the second insulator 33 till the +Y directional end portion of the fitting portion 35A of the rotational shaft member 35 forms a single plane with the +Y directional surface of the lever member 32.

Figure 20:
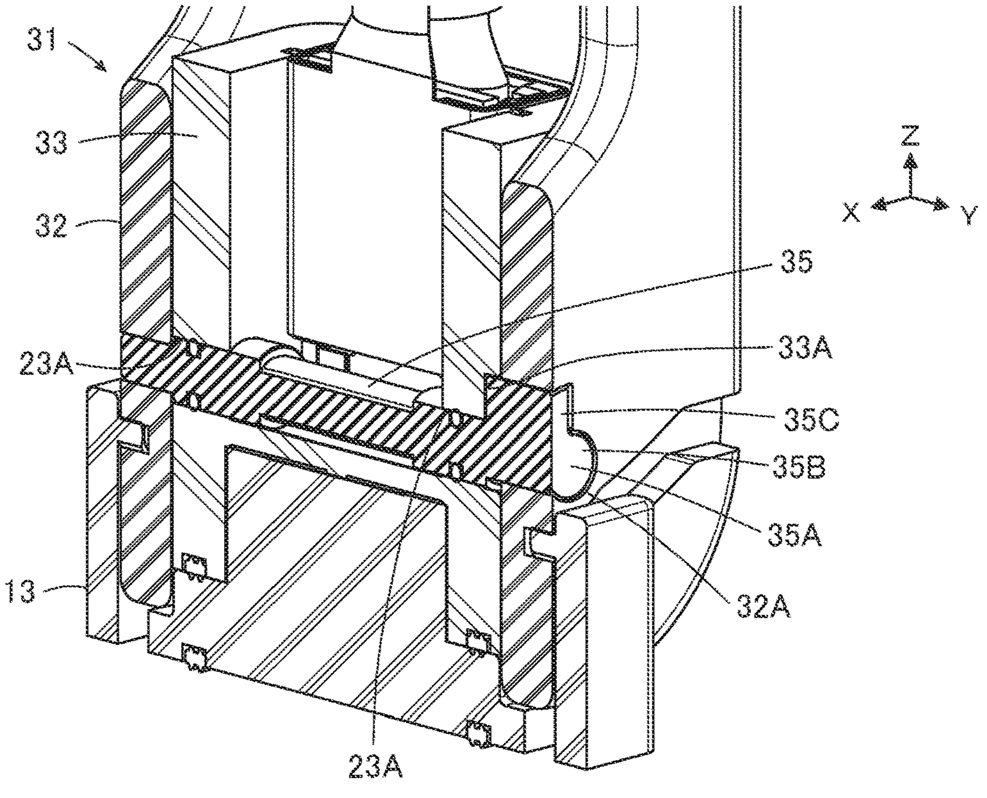
FIG. 20 is a partially broken perspective view showing the connector assembly according to Embodiment 2 with rotation of the lever member being locked.

Consequently, as shown in FIG. 20, the projection 35C of the fitting portion 35A of the rotational shaft member 35 is inserted in the projection housing portion 33A of the second insulator 33. Since the projection housing portion 33A of the second insulator 33 has a shape corresponding to the projection 35C as shown in FIG. 17, when the projection 35C is inserted in the projection housing portion 33A, the rotational shaft member 35 cannot rotate with respect to the second insulator 33.

In addition, since the fitting portion 35A of the rotational shaft member 35 is inserted in the center hole 32A of the lever member 32 at this time, the lever member 32 cannot rotate with respect to the rotational shaft member 35.

As a result, rotation of the lever member 32 with respect to the second insulator 33 is being locked. Accordingly, electrical connection between the first connector 11 and the second connector 31 can be prevented from being impaired by rotation of the lever member 32 for any reason, and the reliability of electrical connection can be further improved.

Meanwhile, the projection 35C of the fitting portion 35A of the rotational shaft member 35 is not necessarily formed into a fan-like shape, and a projection having any shape selected from various shapes can be formed at an outer periphery of the columnar portion 35B.

Embodiment 3

Figure 21:
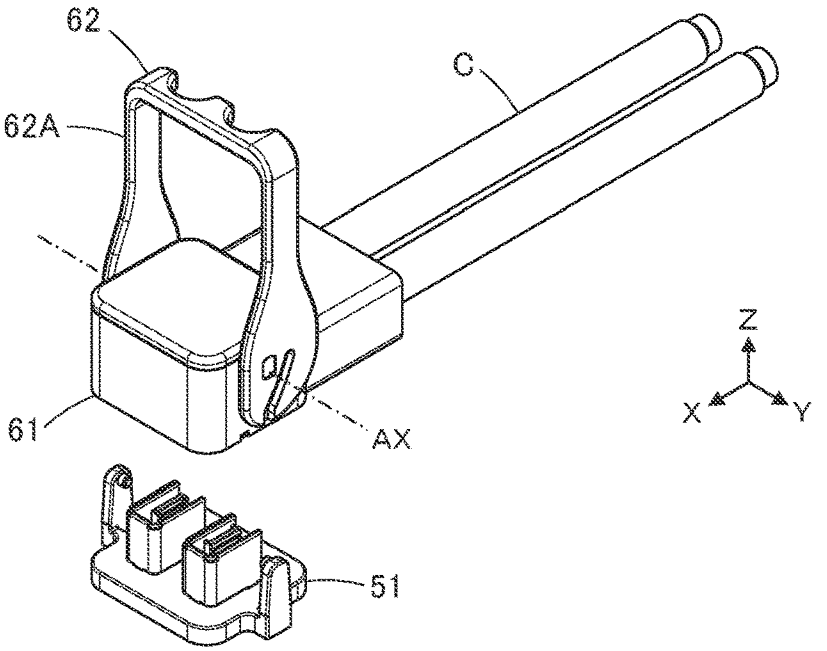
FIG. 21 is a perspective view showing a connector assembly according to Embodiment 3 in the non-fitted state.

FIG. 21 shows a connector assembly according to Embodiment 3 in the non-fitted state. The connector assembly includes a first connector 51 and a second connector 61 that is fitted to the first connector 51 along a fitting direction. The second connector 61 is attached to end portions of the two electric wires C.

Fitting and detaching operations of the first connector 51 and the second connector 61 can be performed by operating a lever member 62 that is attached to the second connector 61 in a rotatable manner about the rotational axis AX.

For convenience, the direction of fitting between the first connector 51 and the second connector 61 is referred to as "Z direction," the direction in which the rotational axis AX of the lever member 62 extends as "Y direction," and the direction orthogonal to the Z direction and the Y direction as "X direction."

The second connector 61 moves from the +Z direction to the −Z direction to be fitted to the first connector 51.

Figure 22:
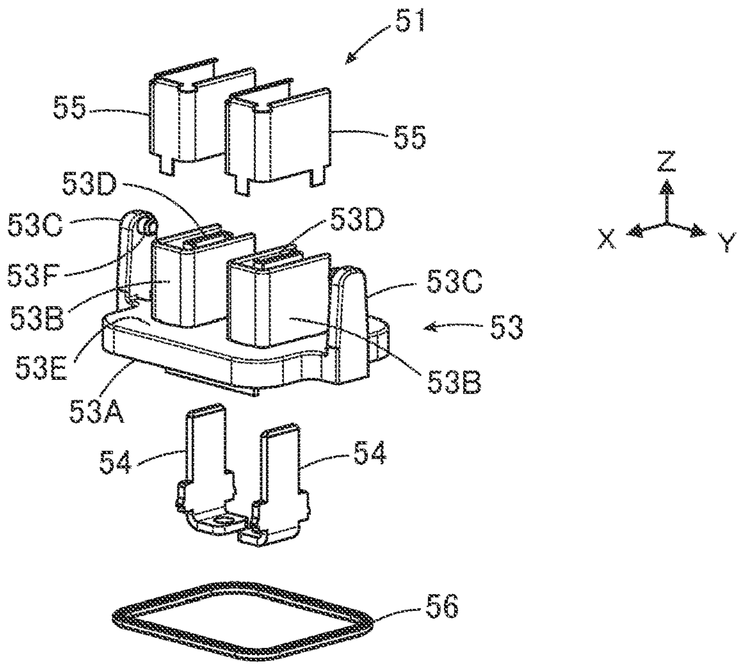
FIG. 22 is an exploded perspective view of a first connector used in Embodiment 3.

FIG. 22 shows an exploded perspective view of the first connector 51. The first connector 51 includes a first insulator 53, and a pair of first contacts 54 each held by the first insulator 53 and extending along the Z direction.

The first insulator 53 includes a base portion 53A of flat plate shape extending along an XY plane, a pair of protruding portions 53B protruding in the +Z direction from a +Z directional surface of the base portion 53A and adjoining each other in the Y direction, and a pair of support portions 53C of flat plate shape separately joined to a +Y directional end portion and a −Y directional end portion of the base portion 53A and extending in the +Z direction while facing each other in the Y direction.

Each of the pair of protruding portions 53B is provided with a second contact housing portion 53D of recess shape opened toward the +Z direction and extending in the Z direction. Of the +Z directional surface of the base portion 53A, a portion around the pair of protruding portions 53B constitutes an abutment surface 53E which contacts the second connector 61 when the first connector 51 and the second connector 61 are fitted with each other.

A pair of pins 53F projecting in the Y direction are separately formed on surfaces of the pair of support portions 53C, the surfaces facing each other. While FIG. 22 shows only the pin 53F formed in the support portion 53C on the −Y direction side, the support portion 53C on the +Y direction side is also provided with a like pin 53F. The two pins 53F are arranged in a straight line along the Y direction.

The first connector 51 also includes a pair of shells 55 separately fixed to outer surfaces of the pair of protruding portions 53B of the first insulator 53, and a waterproof packing 56 disposed on the −Z directional surface of the base portion 53A of the first insulator 53.

Figure 23:
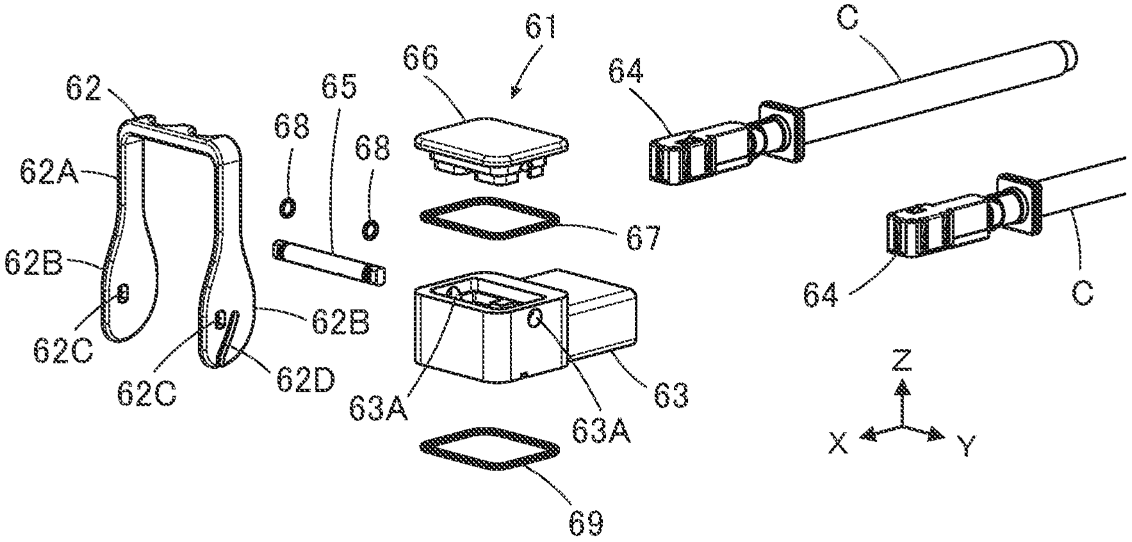
FIG. 23 is an exploded perspective view of a second connector used in Embodiment 3.

FIG. 23 shows an exploded perspective view of the second connector 61. The second connector 61 includes a second insulator 63, a rotational shaft member 65 that penetrates the second insulator 63 in the Y direction and is rotatably attached to the second insulator 63, a lever member 62 that is fixed to the rotational shaft member 65, and a pair of second contacts 64 that are separately connected to end portions of the two electric wires C extending in the X direction.

The second connector 61 also includes a lid portion 66 covering a +Z directional end portion of the second insulator 63.

The pair of second contacts 64 are held in the second insulator 63.

In addition, a pair of through holes 63A are separately formed in Y directional opposite side portions of the second insulator 63 and serve as rotational-shaft-member housing portions through which the rotational shaft member 65 is passed and which separately house opposite end portions of the rotational shaft member 65.

The lever member 62 includes a handle portion 62A bent into a U-shape, and a pair of flat plate portions 62B separately joined to opposite ends of the handle portion 62A so as to face each other in the Y direction and each extending along an XZ plane. The pair of flat plate portions 62B are separately provided with attachment holes 62C. The opposite end portions of the rotational shaft member 65 passing through the pair of through holes 63A of the second insulator 63 are separately jointed to the attachment holes 62C, whereby the lever member 62 is held in a rotatable manner with respect to the second insulator 63.

In addition, cam grooves 62D are separately formed on outer surfaces of the pair of flat plate portions 62B, the outer surfaces facing in opposite directions from each other. While FIG. 23 shows only the cam groove 62D formed in the flat plate portion 62B on the +Y direction side, the flat plate portion 62B on the −Y direction side is also provided with a like cam groove 62D.

The pair of pins 53F of the first insulator 53 are separately inserted into the cam grooves 62D of the pair of flat plate portions 62B, and the cam grooves 62D and the pins 53F constitute a cam mechanism that relatively moves the first insulator 53 and the second insulator 63 along the Z direction in conjunction with rotation of the lever member 62.

In addition, the second connector 61 includes a waterproof packing 67 which seals between the +Z directional end portion of the second insulator 63 and the lid portion 66, a pair of rotational-axis waterproof packings 68 which separately surround the opposite end portions of the rotational shaft member 65 along an XZ plane and each of which seals between an inner surface of each of the pair of through holes 63A of the second insulator 63 and an outer peripheral surface of each of the opposite end portions of the rotational shaft member 65, and a fitting-part waterproof packing 69 which is disposed on the −Z directional front end surface of the second insulator 63 and which seals between the abutment surface 53E of the first insulator 53 and the −Z directional front end surface of the second insulator 63 when the first connector 51 and the second connector 61 are fitted with each other.

Figure 24:
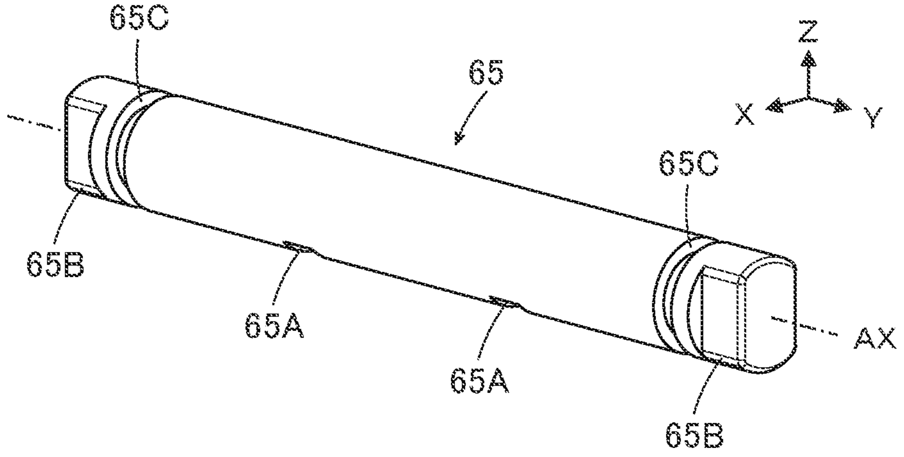
FIG. 24 is a perspective view showing a rotational shaft member used in Embodiment 3.

As shown in FIG. 24, the rotational shaft member 65 extends in the Y direction along the rotational axis AX, a pair of insertion grooves 65A are formed near a center part in the Y direction of the rotational shaft member 65, the insertion grooves 65A each extending in the circumferential direction of the rotational shaft member 65 along an XZ plane that is orthogonal to the rotational axis AX and being arranged in the Y direction with a distance therebetween, and a pair of fitting portions 65B extending in the Y direction are separately formed at Y directional opposite ends of the rotational shaft member 65. In addition, a pair of packing holding grooves 65C of annular shape are each formed between one of the pair of insertion grooves 65A and one of the pair of fitting portions 65B at the outer periphery of the rotational shaft member 65 along an XZ plane.

The pair of fitting portions 65B are joined to the lever member 62 by being each inserted into the attachment hole 62C of the corresponding flat plate portion 62B of the lever member 62. Moreover, the pair of rotational-axis waterproof packings 68 are separately fitted into the pair of packing holding grooves 65C of annular shape to be thereby held by the rotational shaft member 65.

Figure 25:
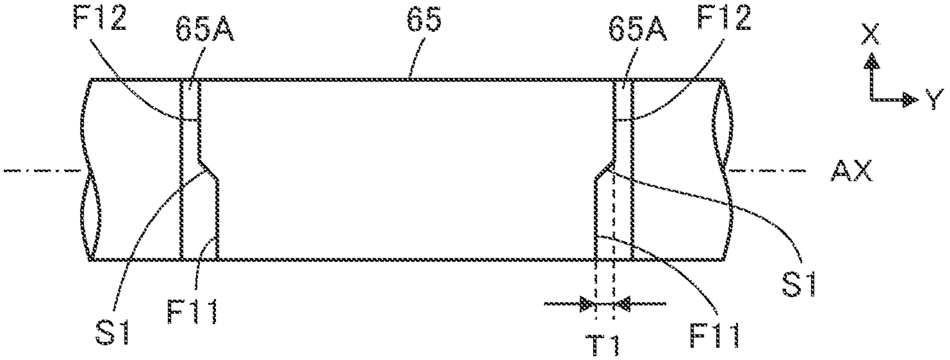
FIG. 25 is a partial plan view showing the rotational shaft member used in Embodiment 3.

The pair of insertion grooves 65A are not formed to extend along the entire circumference of the rotational shaft member 65 but to extend in the circumferential direction along an XZ plane only in a predetermined angle range, e.g., a range of 180 degrees. As shown in FIG. 25, in each of the pair of insertion grooves 65A, a step portion S1 is provided in a side surface, and a first side surface portion F11 and a second side surface portion F12 are arranged adjacently to each other in the circumferential direction of the rotational shaft member 65, with the step portion S1 being interposed therebetween. The first side surface portion F11 and the second side surface portion F12 each face in the Y direction, i.e., the axial direction along the rotational axis AX, and, due to the presence of the step portion S1, the second side surface portion F12 is shifted toward an end portion of the rotational shaft member 65 in the Y direction from the first side surface portion F11 by a distance T1 and forms a cam surface.

Meanwhile, regardless of the foregoing configuration, a plurality of cam surfaces may be arranged at regular angle intervals in the circumferential direction and along an XZ plane.

Next, the fitting operation between the first connector 51 and the second connector 61 will be described.

As shown in FIG. 21, the rotation angle of the lever member 62 with the handle portion 62A extending in the Z direction is defined as "zero degrees," and this rotation position of the lever member 62 is defined as "initial rotation position." The lever member 62 is rotatably attached to the second connector 61 such that the rotation angle can be changed from zero degrees to 90 degrees.

Figure 26:
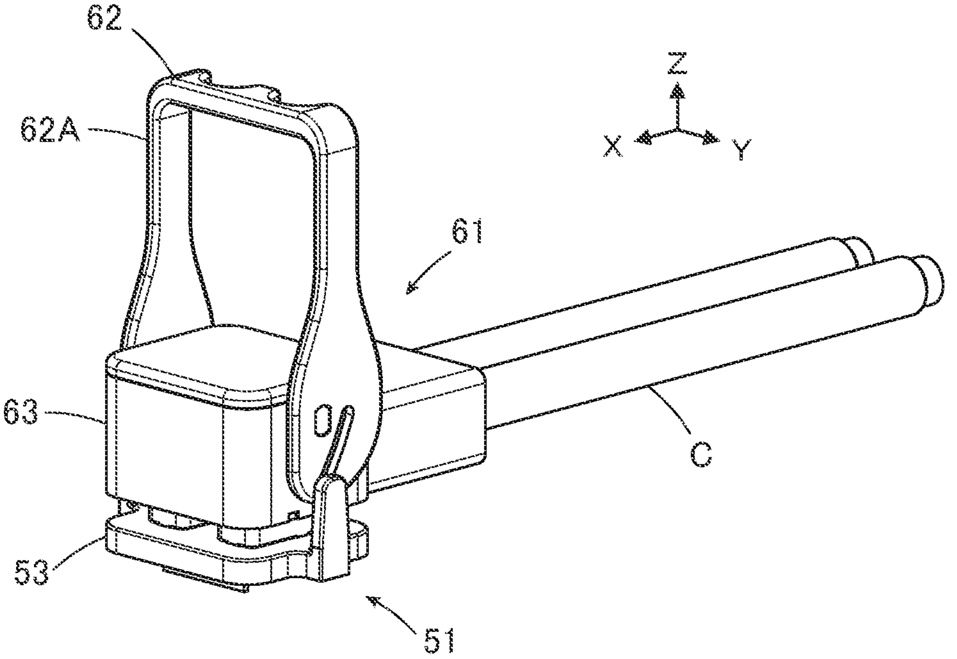
FIG. 26 is a perspective view showing the connector assembly according to Embodiment 3 when the rotation angle of a lever member in the fitting operation is zero degrees.

First, with the lever member 62 having the rotation angle of zero degrees, the second connector 61 is moved from the +Z direction to the −Z direction toward the first connector 51, whereby a +Z directional portion of the first insulator 53 of the first connector 51 is inserted in the second insulator 63 of the second connector 61 as shown in FIG. 26.

Figure 27:
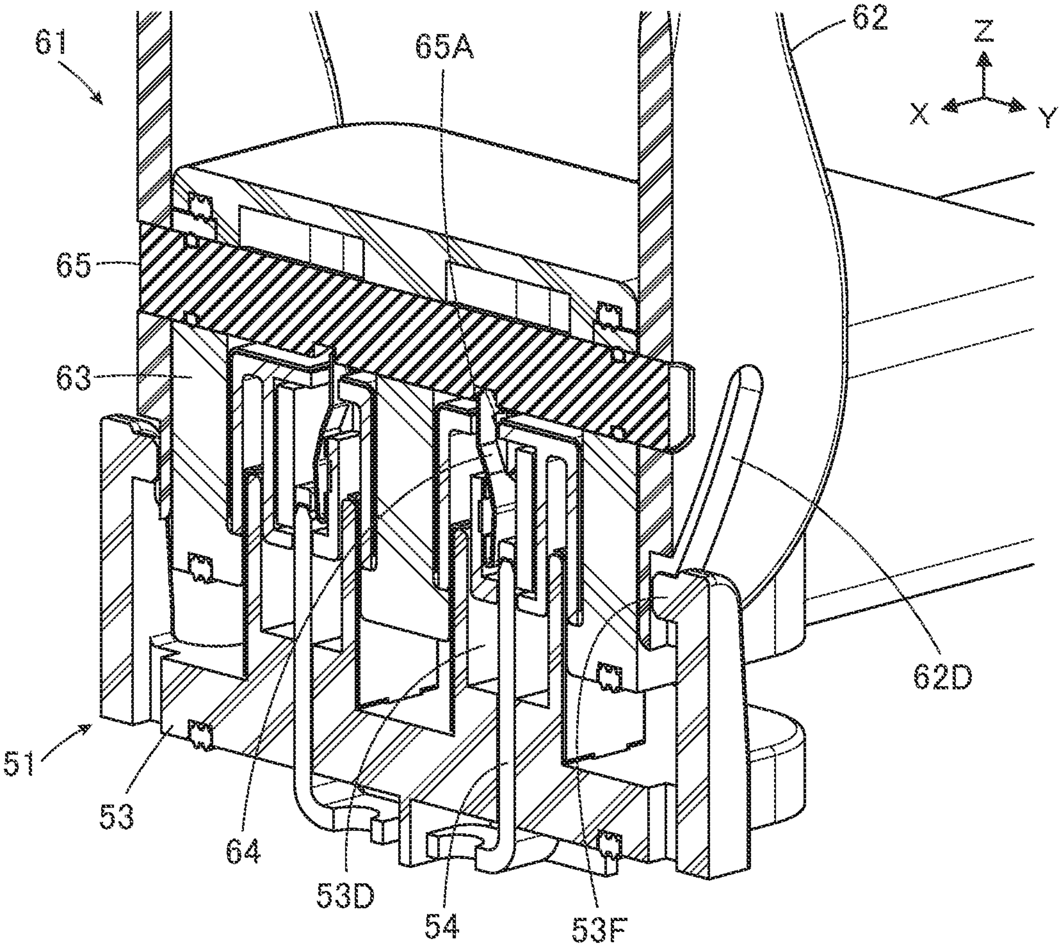
FIG. 27 is a partially broken perspective view showing the connector assembly according to Embodiment 3 when the rotation angle of the lever member in the fitting operation is zero degrees.

Consequently, as shown in FIG. 27, the pin 53F of the first insulator 53 of the first connector 51 is inserted to an entrance of the cam groove 62D of the lever member 62 attached to the second connector 61, and the second insulator 63 is situated at a start-of-fitting position with respect to the first insulator 53.

In addition, the second contact 64 held inside the second insulator 63 is inserted to a middle position of the interior in the Z direction of the second contact housing portion 53D of the first connector 51.

Figure 28:
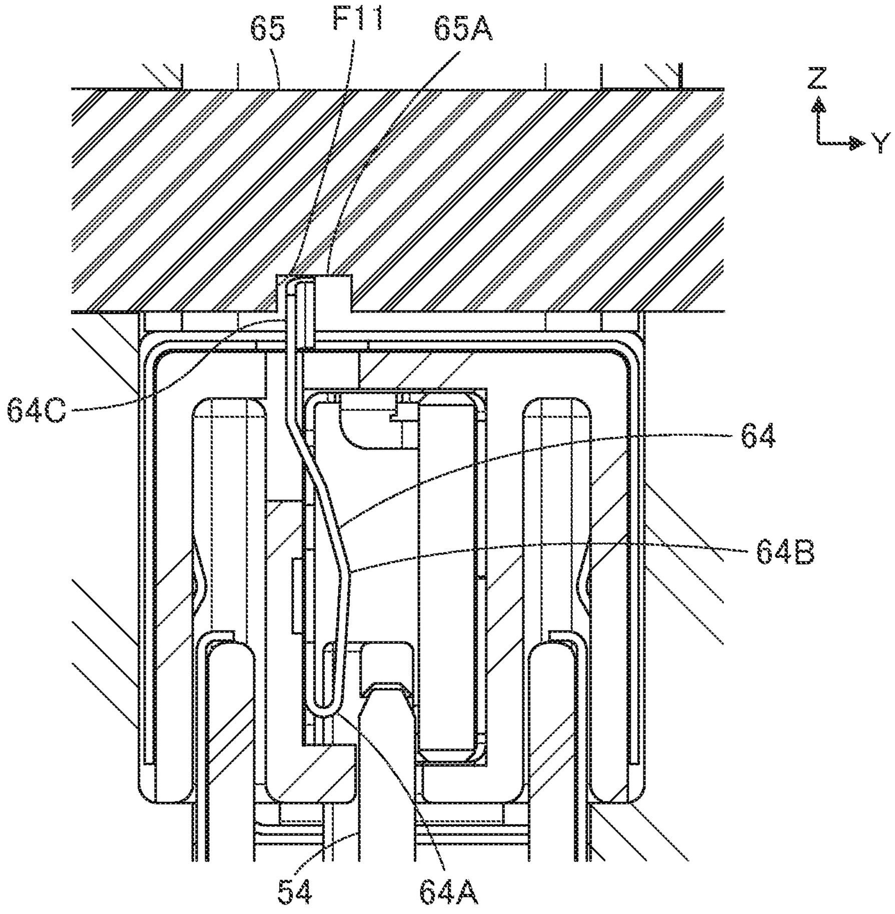
FIG. 28 is an enlarged partial cross-sectional view showing the connector assembly according to Embodiment 3 when the rotation angle of the lever member in the fitting operation is zero degrees.

As shown in FIG. 28, the second contact 64 is composed of a spring contact bent into a U-shape, and includes a fulcrum portion 64A formed at a bent portion of U-shape, a contact point portion 64B situated on the +Z direction side of the fulcrum portion 64A, and a point-of-effort portion 64C situated on the +Z direction side of the contact point portion 64B and forming a free end.

In this state, the contact point portion 64B of the second contact 64 has not yet reached a position to face the first contact 54 of the first connector 51.

Figure 29:
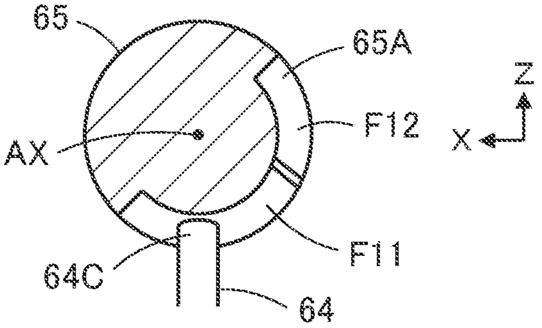
FIG. 29 is a cross-sectional view showing the rotational shaft member used in Embodiment 3 when the rotation angle of the lever member in the fitting operation is zero degrees.

While the point-of-effort portion 64C formed at the +Z directional end portion of the second contact 64 is inserted in the insertion groove 65A formed in the rotational shaft member 65, when the rotation angle of the lever member 62 is zero degrees, the first side surface portion F11 of the insertion groove 65A faces the point-of-effort portion 64C as shown in FIG. 29.

Accordingly, as shown in FIG. 28, the point-of-effort portion 64C of the second contact 64 is situated apart from the first side surface portion F11 of the insertion groove 65A in the Y direction and is not in contact with the rotational shaft member 65.

Figure 30:
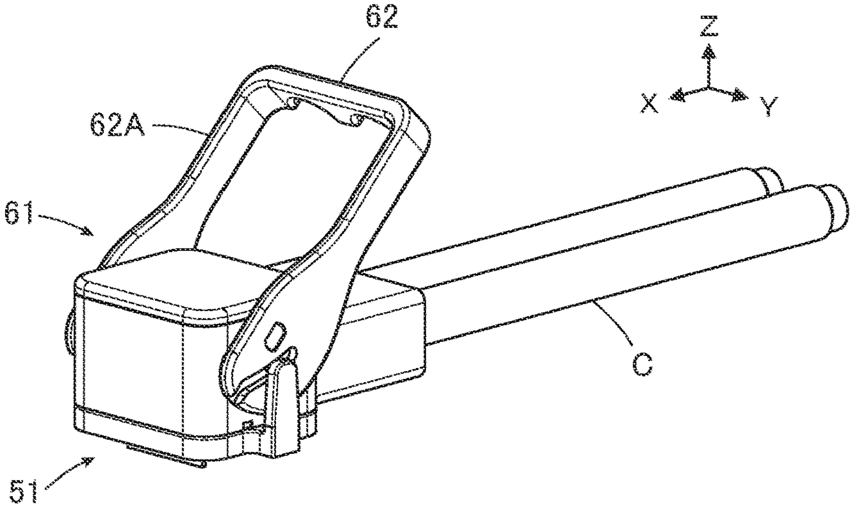
FIG. 30 is a perspective view showing the connector assembly according to Embodiment 3 when the rotation angle of the lever member in the fitting operation is 45 degrees.
Figure 31:
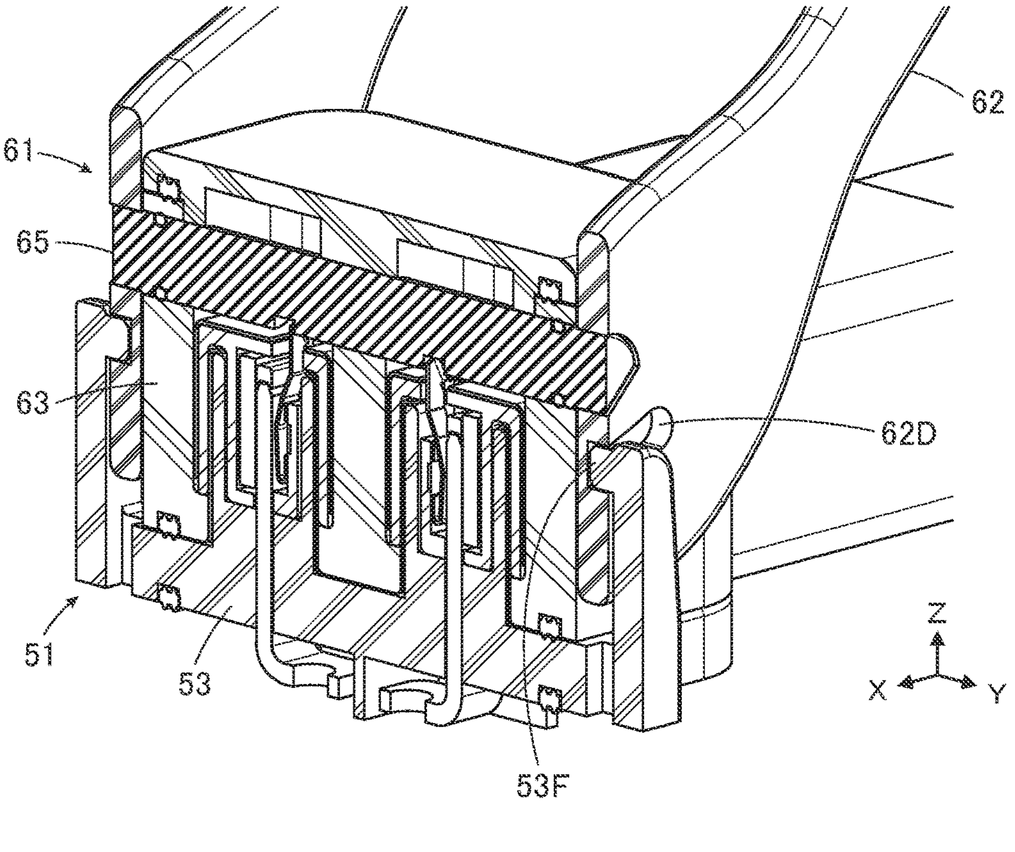
FIG. 31 is a partially broken perspective view showing the connector assembly according to Embodiment 3 when the rotation angle of the lever member in the fitting operation is 45 degrees.

Next, as shown in FIG. 30, when the lever member 62 is rotated till the handle portion 62A is positioned at 45 degrees to the Z direction, as shown in FIG. 31, the pin 53F of the first insulator 53 of the first connector 51 relatively advances along the cam groove 62D of the lever member 62, and the second insulator 63 of the second connector 61 moves in the −Z direction with respect to the first insulator 53 of the first connector 51.

Figure 32:
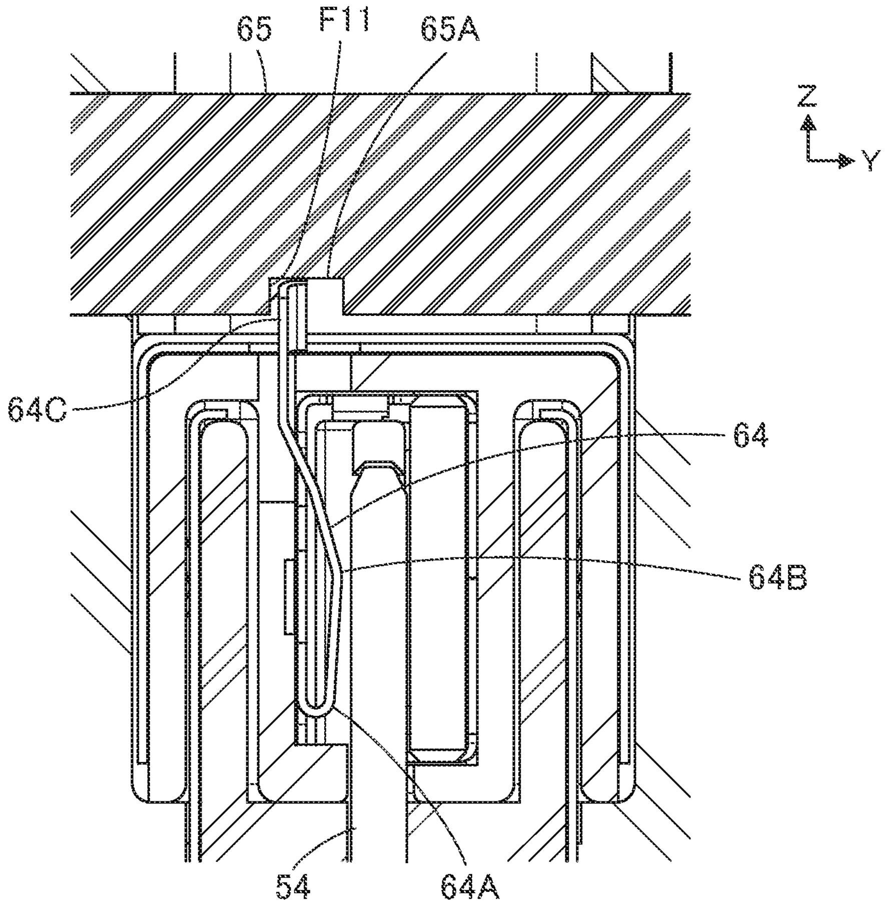
FIG. 32 is an enlarged partial cross-sectional view showing the connector assembly according to Embodiment 3 when the rotation angle of the lever member in the fitting operation is 45 degrees.

Consequently, the contact point portion 64B of the second contact 64 is situated to face a side surface of the first contact 54 of the first connector 51 as shown in FIG. 32. In this state, the Z directional position of the second insulator 63 with respect to the first insulator 53 is defined as "fitting position," and the rotation position of the lever member 62 is defined as "first rotation position."

Figure 33:
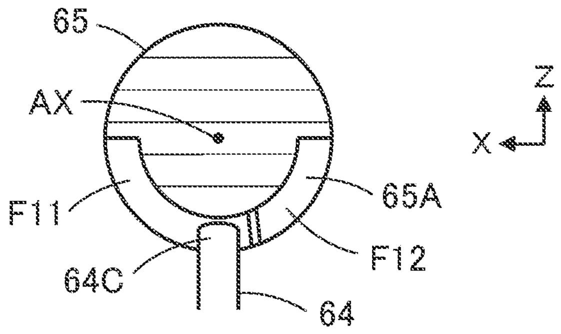
FIG. 33 is a cross-sectional view showing the rotational shaft member used in Embodiment 3 when the rotation angle of the lever member in the fitting operation is 45 degrees.

At this time, in accordance with rotation of the lever member 62, the rotational shaft member 65 also rotates 45 degrees about the rotational axis AX, while the first side surface portion F11 of the insertion groove 65A still faces the point-of-effort portion 64C, and the point-of-effort portion 64C of the second contact 64 is kept in a non-contact state with the rotational shaft member 65 as shown in FIG. 33.

Figure 34:
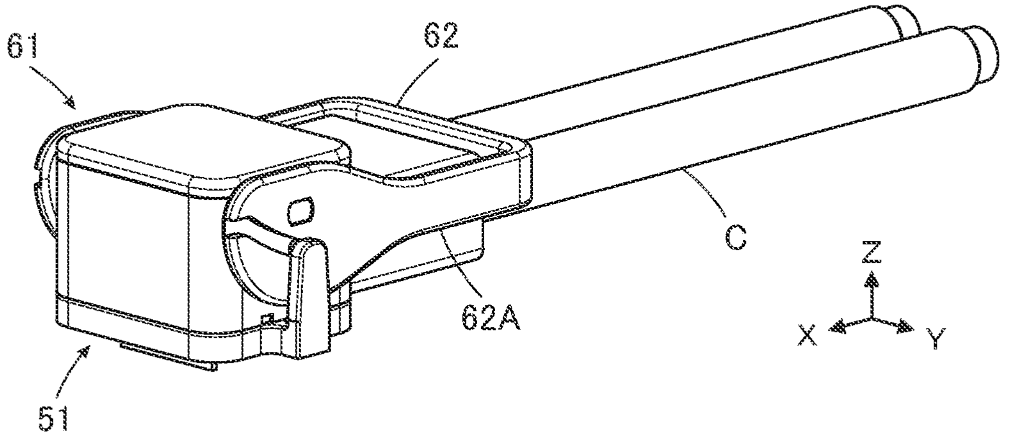
FIG. 34 is a perspective view showing the connector assembly according to Embodiment 3 when the rotation angle of the lever member in the fitting operation is 90 degrees.
Figure 35:
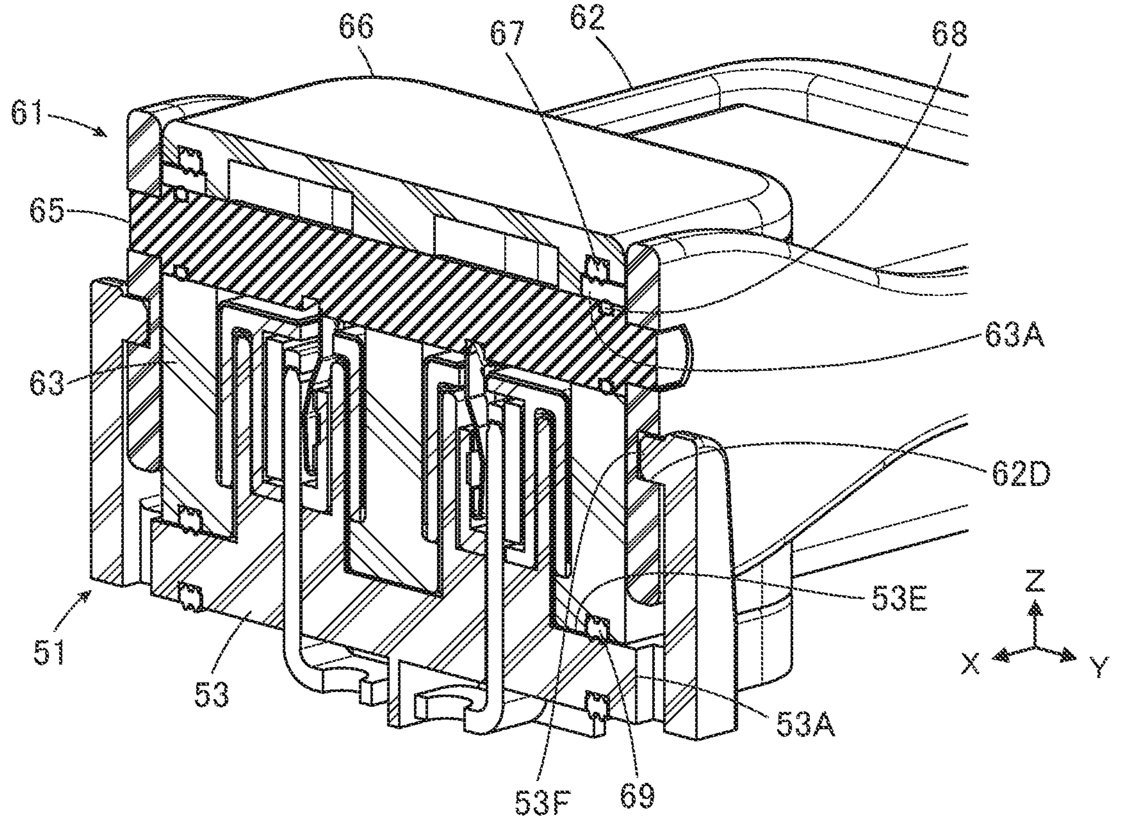
FIG. 35 is a partially broken perspective view showing the connector assembly according to Embodiment 3 when the rotation angle of the lever member in the fitting operation is 90 degrees.

As shown in FIG. 34, when the lever member 62 in this state is rotated till the handle portion 62A is positioned at 90 degrees to the Z direction, as shown in FIG. 35, the pin 53F of the first insulator 53 of the first connector 51 is inserted to the deepest part of the cam groove 62D of the lever member 62, while the Z directional position of the second insulator 63 with respect to the first insulator 53 does not change due to the shape of the cam groove 62D.

Figure 36:
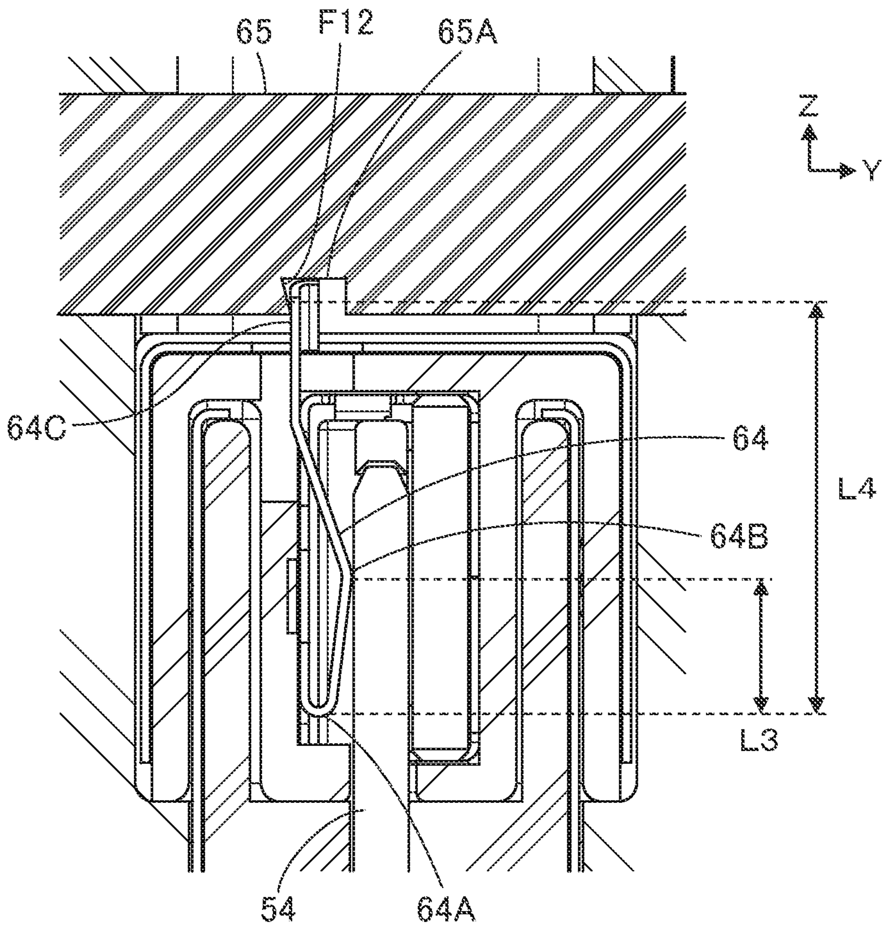
FIG. 36 is an enlarged partial cross-sectional view showing the connector assembly according to Embodiment 3 when the rotation angle of the lever member in the fitting operation is 90 degrees.

Accordingly, as shown in FIG. 36, the second insulator 63 of the second connector 61 is kept to be held at the fitting position with respect to the first insulator 53 of the first connector 51, and the contact point portion 64B of the second contact 64 is kept to face the side surface of the first contact 54 of the first connector 51.

Figure 37:
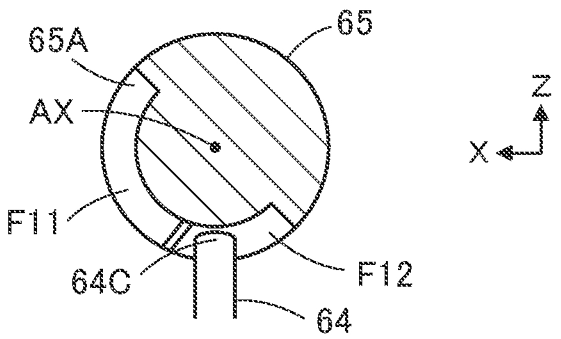
FIG. 37 is a cross-sectional view showing the rotational shaft member used in Embodiment 3 when the rotation angle of the lever member in the fitting operation is 90 degrees.

Meanwhile, in accordance with rotation of the lever member 62, the rotational shaft member 65 also rotates about the rotational axis AX, and the second side surface portion F12 of the insertion groove 65A forming the cam surface faces the point-of-effort portion 64C as shown in FIG. 37. Since the second side surface portion F12 is shifted toward an end portion of the rotational shaft member 65 in the Y direction from the first side surface portion F11 by the distance T1, the second side surface portion F12 contacts the point-of-effort portion 64C of the second contact 64 to press the point-of-effort portion 64C in the Y direction.

Since a distance L4 from the fulcrum portion 64A to the point-of-effort portion 64C in the second contact 64 is designed to be longer than a distance L3 from the fulcrum portion 64A to the contact point portion 64B, the so-called principle of leverage works such that the contact point portion 64B receives a force larger than a pressing force the point-of-effort portion 64C receives from the second side surface portion F12 of the insertion groove 65A of the rotational shaft member 65, whereby the contact point portion 64B of the second contact 64 contacts the first contact 54 with a high contact pressure.

The rotation position of the lever member 62 at this time is defined as "second rotation position."

As described above, by rotating the lever member 62 from the initial rotation position where the handle portion 62A has an angle of zero degrees with respect to the Z direction to the first rotation position where the handle portion 62A has an angle of 45 degrees with respect to the Z direction, the second insulator 63 of the second connector 61 can be moved from the start-of-fitting position to the fitting position with respect to the first insulator 53 of the first connector 51 while the point-of-effort portion 64C of the second contact 64 is not in contact with the rotational shaft member 65, and the first connector 51 and the second connector 61 can be easily fitted to each other with a small insertion force.

Further, by rotating the lever member 62 from the first rotation position to the second rotation position where the handle portion 62A has an angle of 90 degrees with respect to the Z direction, the point-of-effort portion 64C of the second contact 64 is then pressed in the Y direction by the second side surface portion F12 of the insertion groove 65A of the rotational shaft member 65 while the second insulator 63 of the second connector 61 is kept at the fitting position with respect to the first insulator 53 of the first connector 51, and the contact point portion 64B of the second contact 64 can be brought into contact with the first contact 54 with a high contact pressure.

At this time, since the first contact 54 and the second contact 64 are pressed against each other in the Y direction without rubbing against each other in the Z direction, the first contact 54 and the second contact 64 can be electrically connected to each other while preventing surface damage thereof.

In addition, as shown in FIG. 35, when the second insulator 63 of the second connector 61 is situated at the fitting position with respect to the first insulator 53 of the first connector 51, the fitting-part waterproof packing 69 disposed on the −Z directional front end surface of the second insulator 63 is pressed against the abutment surface 53E of the base portion 53A of the first insulator 53 to thereby seal between the front end surface of the second insulator 63 and the abutment surface 53E.

Moreover, due to the presence of the rotational-axis waterproof packings 68 separately attached to the Y directional opposite end portions of the rotational shaft member 65, a portion between the inner surface of each of the through holes 63A of the first insulator 63 and the outer peripheral surface of the rotational shaft member 65 is sealed.

In addition, the waterproof packing 67 seals between the +Z directional end portion of the second insulator 63 and the lid portion 66.

Accordingly, the connection parts between the first contact 54 and the second contact 64 can be prevented from water infiltration from the outside.

Embodiment 4

Figure 38:
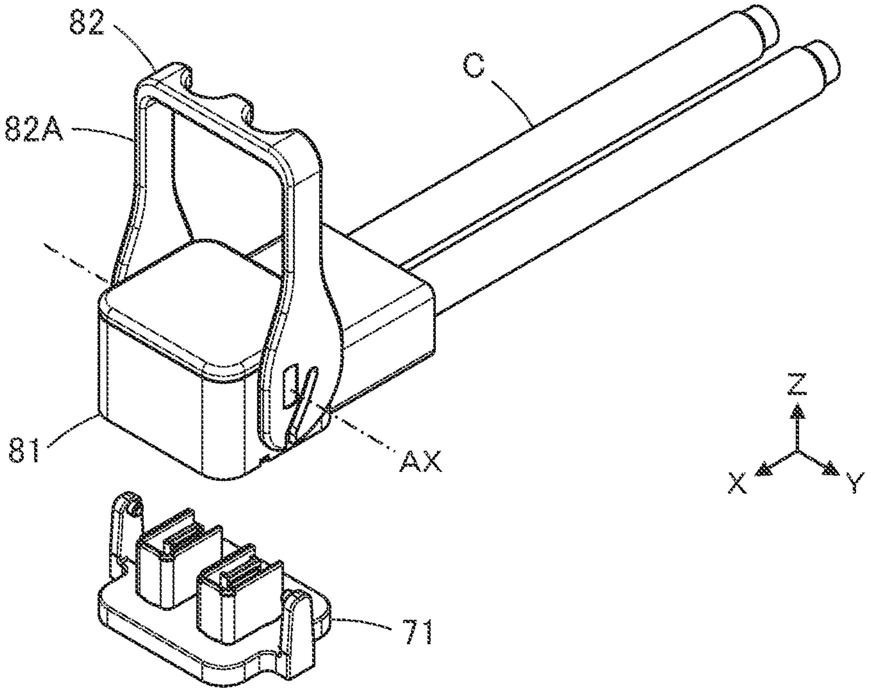
FIG. 38 is a perspective view showing a connector assembly according to Embodiment 4 in the non-fitted state.

FIG. 38 shows a connector assembly according to Embodiment 4 in the non-fitted state. The connector assembly includes a first connector 71 and a second connector 81 that is fitted to the first connector 71 along a fitting direction. The second connector 81 is attached to end portions of the two electric wires C.

Fitting and detaching operations of the first connector 71 and the second connector 81 can be performed by operating a lever member 82 that is attached to the second connector 81 in a rotatable manner about a rotational axis AX.

For convenience, the direction of fitting between the first connector 71 and the second connector 81 is referred to as "Z direction," the direction in which the rotational axis AX of the lever member 82 extends as "Y direction," and the direction orthogonal to the Z direction and the Y direction as "X direction."

The second connector 81 moves from the +Z direction to the −Z direction to be fitted to the first connector 71.

Figure 39:
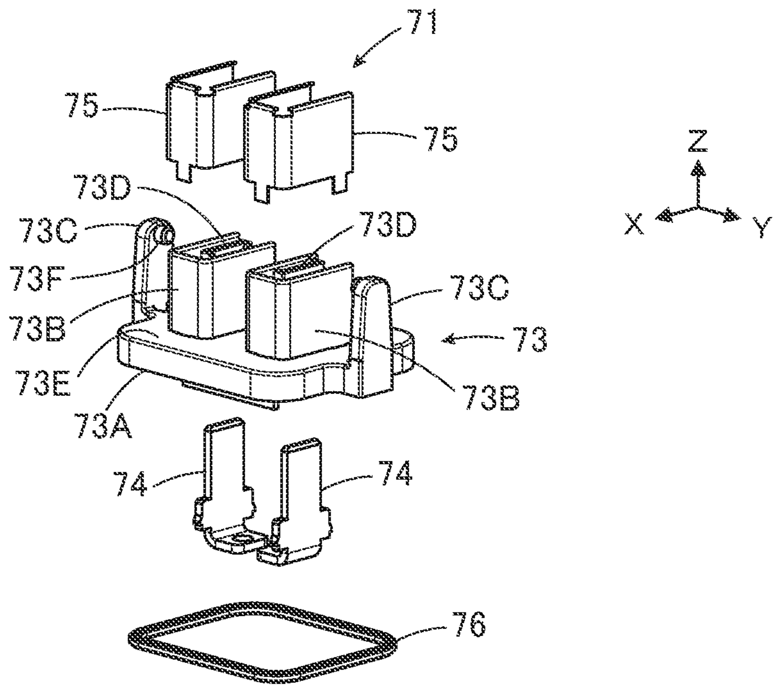
FIG. 39 is an exploded perspective view of a first connector used in Embodiment 4.

FIG. 39 shows an exploded perspective view of the first connector 71. The first connector 71 includes a first insulator 73, and a pair of first contacts 74 each held by the first insulator 73 and extending along the Z direction.

The first insulator 73 includes a base portion 73A of flat plate shape extending along an XY plane, a pair of protruding portions 73B protruding in the +Z direction from a +Z directional surface of the base portion 73A and adjoining each other in the Y direction, and a pair of support portions 73C of flat plate shape separately joined to a +Y directional end portion and a −Y directional end portion of the base portion 73A and extending in the +Z direction while facing each other in the Y direction.

Each of the pair of protruding portions 73B is provided with a second contact housing portion 73D of recess shape opened toward the +Z direction and extending in the Z direction. Of the +Z directional surface of the base portion 73A, a portion around the pair of protruding portions 73B constitutes an abutment surface 73E which contacts the second connector 81 when the first connector 71 and the second connector 81 are fitted with each other.

A pair of pins 73F projecting in the Y direction are separately formed on surfaces of the pair of support portions 73C, the surfaces facing each other. While FIG. 39 shows only the pin 73F formed in the support portion 73C on the −Y direction side, the support portion 73C on the +Y direction side is also provided with a like pin 73F. The two pins 73F are arranged in a straight line along the Y direction.

The first connector 71 also includes a pair of shells 75 separately fixed to outer surfaces of the pair of protruding portions 73B of the first insulator 73, and a waterproof packing 76 disposed on the −Z directional surface of the base portion 73A of the first insulator 73.

Figure 40:
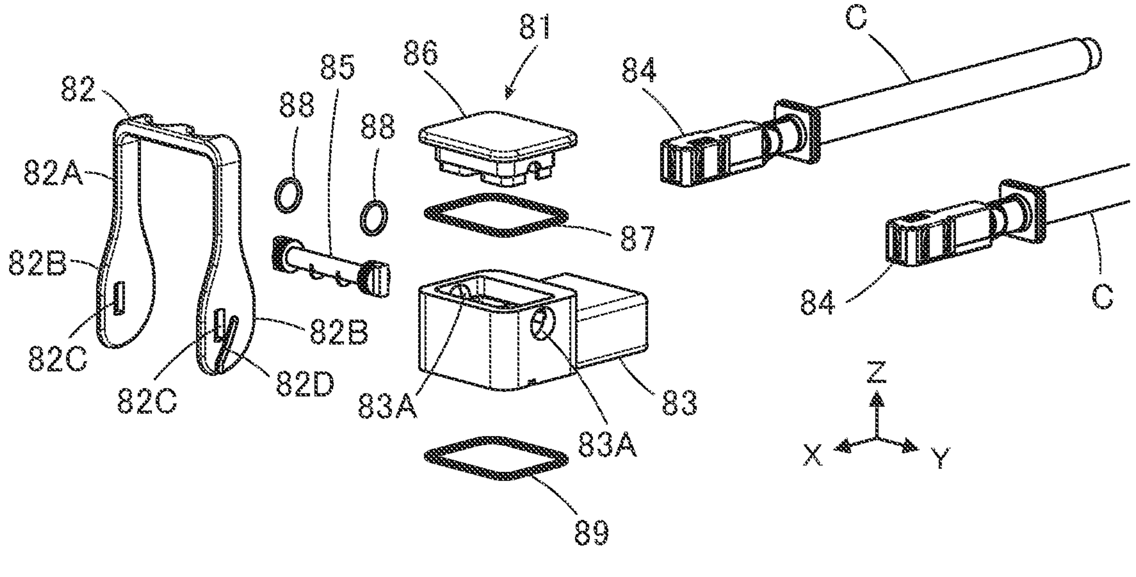
FIG. 40 is an exploded perspective view of a second connector used in Embodiment 4.

FIG. 40 shows an exploded perspective view of the second connector 81. The second connector 81 includes a second insulator 83, a rotational shaft member 85 that penetrates the second insulator 83 in the Y direction and is rotatably attached to the second insulator 83, a lever member 82 that is fixed to the rotational shaft member 85, and a pair of second contacts 84 that are separately connected to end portions of the two electric wires C extending in the X direction.

The second connector 81 also includes a lid portion 86 covering a +Z directional end portion of the second insulator 83.

The pair of second contacts 84 are held in the second insulator 83.

In addition, a pair of through holes 83A are separately formed in Y directional opposite side portions of the second insulator 83 and serve as rotational-shaft-member housing portions through which the rotational shaft member 85 is passed and which separately house opposite end portions of the rotational shaft member 85.

The lever member 82 includes a handle portion 82A bent into a U-shape, and a pair of flat plate portions 82B separately joined to opposite ends of the handle portion 82A so as to face each other in the Y direction and each extending along an XZ plane. The pair of flat plate portions 82B are separately provided with attachment holes 82C. The opposite end portions of the rotational shaft member 85 passing through the pair of through holes 83A of the second insulator 83 are separately jointed to the attachment holes 82C, whereby the lever member 82 is held in a rotatable manner with respect to the second insulator 83.

In addition, cam grooves 82D are separately formed on outer surfaces of the pair of flat plate portions 82B, the outer surfaces facing in opposite directions from each other. While FIG. 40 shows only the cam groove 82D formed in the flat plate portion 82B on the +Y direction side, the flat plate portion 82B on the −Y direction side is also provided with a like cam groove 82D.

The pair of pins 73F of the first insulator 73 are separately inserted into the cam grooves 82D of the pair of flat plate portions 82B, and the cam grooves 82D and the pins 73F constitute a cam mechanism that relatively moves the first insulator 73 and the second insulator 83 along the Z direction in conjunction with rotation of the lever member 82.

In addition, the second connector 81 includes a waterproof packing 87 which seals between the +Z directional end portion of the second insulator 83 and the lid portion 86, a pair of rotational-axis waterproof packings 88 which separately surround the opposite end portions of the rotational shaft member 85 along an XZ plane and each of which seals between an inner surface of each of the pair of through holes 83A of the second insulator 83 and an outer peripheral surface of each of the opposite end portions of the rotational shaft member 85, and a fitting-part waterproof packing 89 which is disposed on the −Z directional front end surface of the second insulator 83 and which seals between the abutment surface 73E of the first insulator 73 and the −Z directional front end surface of the second insulator 83 when the first connector 71 and the second connector 81 are fitted with each other.

Figure 41:
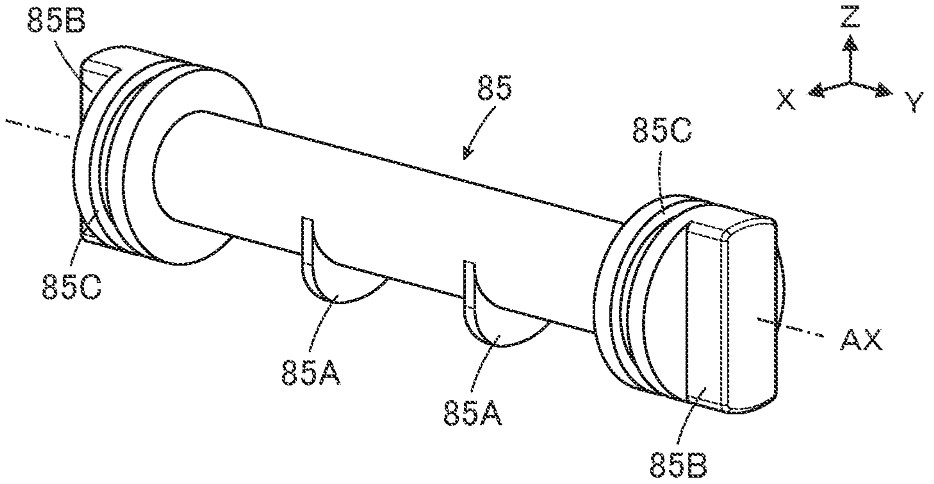
FIG. 41 is a perspective view showing a rotational shaft member used in Embodiment 4.

As shown in FIG. 41, the rotational shaft member 85 extends in the Y direction along the rotational axis AX, a pair of protruding plates 85A are formed near a center part in the Y direction of the rotational shaft member 85, the protruding plates 85A each extending in the circumferential direction of the rotational shaft member 85 along an XZ plane that is orthogonal to the rotational axis AX and being arranged in the Y direction with a distance therebetween, and a pair of fitting portions 85B extending in the Y direction are separately formed at Y directional opposite ends of the rotational shaft member 85. In addition, a pair of packing holding grooves 85C of annular shape are each formed between one of the pair of protruding plates 85A and one of the pair of fitting portions 85B at the outer periphery of the rotational shaft member 85 along an XZ plane.

The pair of fitting portions 85B are joined to the lever member 82 by being each inserted into the attachment hole 82C of the corresponding flat plate portion 82B of the lever member 82. Moreover, the pair of rotational-axis waterproof packings 88 are separately fitted into the pair of packing holding grooves 85C of annular shape to be thereby held by the rotational shaft member 85.

Figure 42:
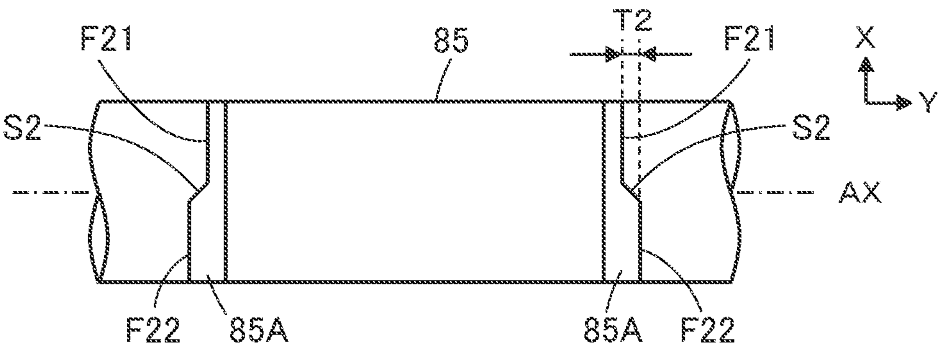
FIG. 42 is a partial plan view showing the rotational shaft member used in Embodiment 4.

The pair of protruding plates 85A are not formed to extend along the entire circumference of the rotational shaft member 85 but to extend in the circumferential direction along an XZ plane only in a predetermined angle range, e.g., a range of 180 degrees. As shown in FIG. 42, in each of the pair of protruding plates 85A, a step portion S2 is provided in a surface facing in the Y direction, and a first outer surface portion F21 and a second outer surface portion F22 are arranged adjacently to each other in the circumferential direction of the rotational shaft member 85, with the step portion S2 being interposed therebetween. The first outer surface portion F21 and the second outer surface portion F22 each face in the Y direction, i.e., the axial direction along the rotational axis AX, and, due to the presence of the step portion S2, the second outer surface portion F22 is shifted toward an end portion of the rotational shaft member 85 in the Y direction from the first outer surface portion F21 by a distance T2 and forms a cam surface.

Meanwhile, regardless of the foregoing configuration, a plurality of cam surfaces may be arranged at regular angle intervals in the circumferential direction and along an XZ plane.

Next, the fitting operation between the first connector 71 and the second connector 81 will be described.

As shown in FIG. 38, the rotation angle of the lever member 82 with the handle portion 82A extending in the Z direction is defined as "zero degrees," and this rotation position of the lever member 82 is defined as "initial rotation position." The lever member 82 is rotatably attached to the second connector 81 such that the rotation angle can be changed from zero degrees to 90 degrees.

Figure 43:
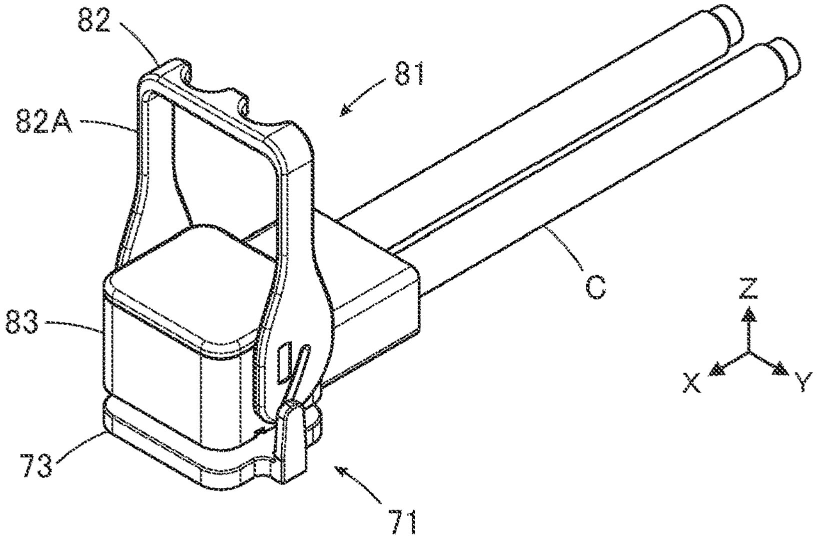
FIG. 43 is a perspective view showing the connector assembly according to Embodiment 4 when the rotation angle of a lever member in the fitting operation is zero degrees.

First, with the lever member 82 having the rotation angle of zero degrees, the second connector 81 is moved from the +Z direction to the −Z direction toward the first connector 71, whereby a +Z directional portion of the first insulator 73 of the first connector 71 is inserted in the second insulator 83 of the second connector 81 as shown in FIG. 43.

Figure 44:
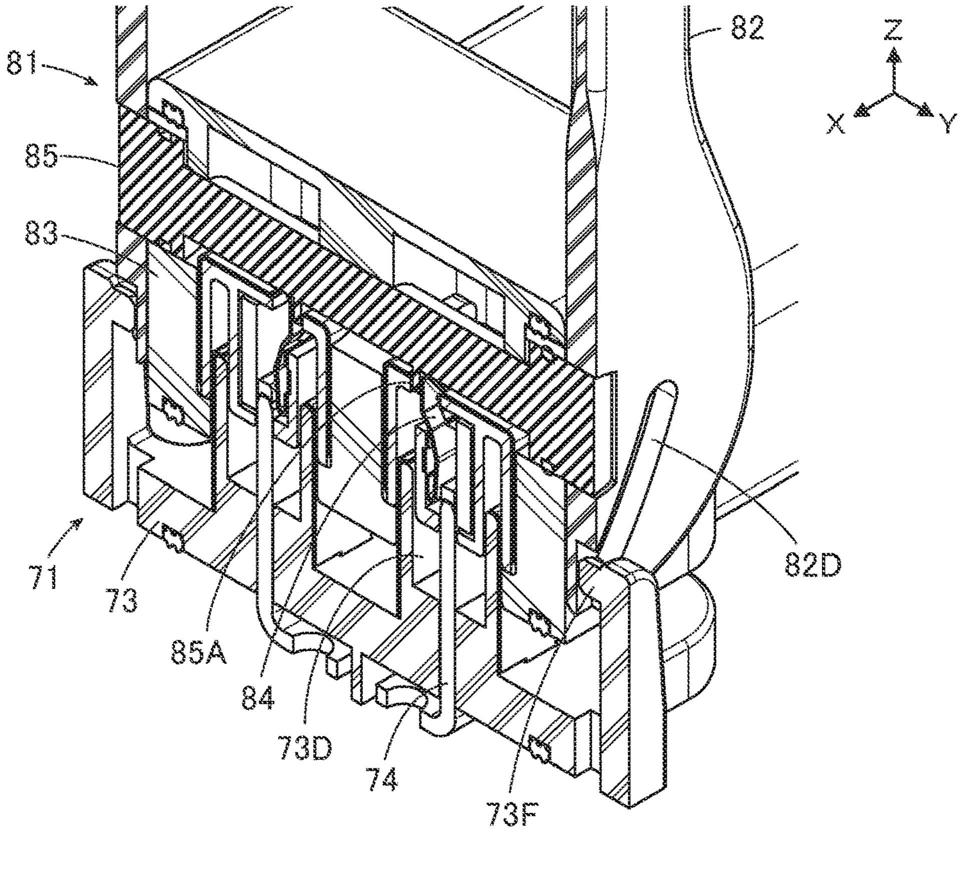
FIG. 44 is a partially broken perspective view showing the connector assembly according to Embodiment 4 when the rotation angle of the lever member in the fitting operation is zero degrees.

Consequently, as shown in FIG. 44, the pin 73F of the first insulator 73 of the first connector 71 is inserted to an entrance of the cam groove 82D of the lever member 82 attached to the second connector 81, and the second insulator 83 is situated at a start-of-fitting position with respect to the first insulator 73.

In addition, the second contact 84 held inside the second insulator 83 is inserted to a middle position of the interior in the Z direction of the second contact housing portion 73D of the first connector 71.

Figure 45:
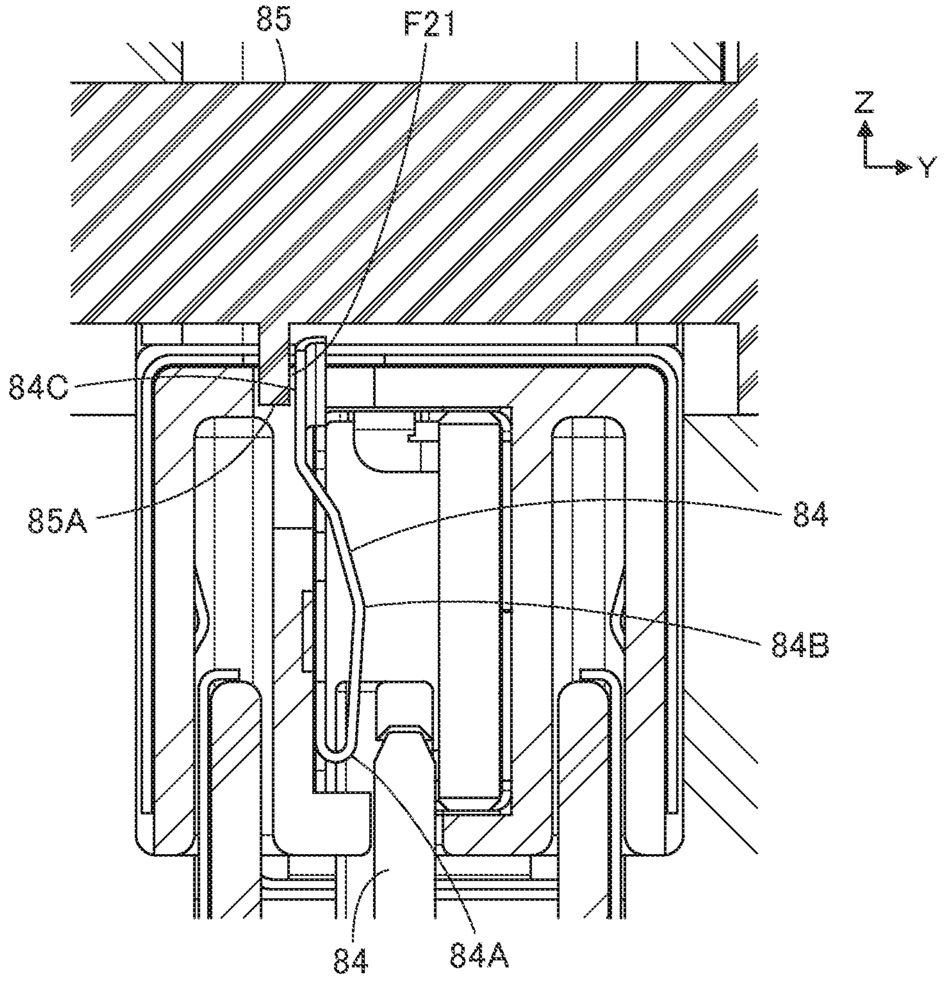
FIG. 45 is an enlarged partial cross-sectional view showing the connector assembly according to Embodiment 4 when the rotation angle of the lever member in the fitting operation is zero degrees.

As shown in FIG. 45, the second contact 84 is composed of a spring contact bent into a U-shape, and includes a fulcrum portion 84A formed at a bent portion of U-shape, a contact point portion 84B situated on the +Z direction side of the fulcrum portion 84A, and a point-of-effort portion 84C situated on the +Z direction side of the contact point portion 84B and forming a free end.

In this state, the contact point portion 84B of the second contact 84 has not yet reached a position to face the first contact 74 of the first connector 71.

Figure 46:
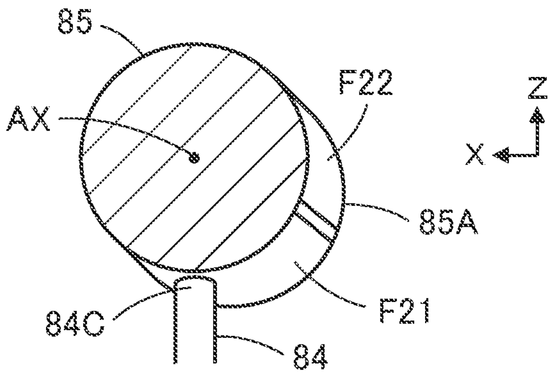
FIG. 46 is a cross-sectional view showing the rotational shaft member used in Embodiment 4 when the rotation angle of the lever member in the fitting operation is zero degrees.

While the point-of-effort portion 84C formed at the +Z directional end portion of the second contact 84 is situated at the same Z directional position as that of the protruding plate 85A formed in the rotational shaft member 85, when the rotation angle of the lever member 82 is zero degrees, the first outer surface portion F21 of the protruding plate 85A faces the point-of-effort portion 84C as shown in FIG. 46.

Accordingly, as shown in FIG. 45, the point-of-effort portion 84C of the second contact 84 is situated apart from the first outer surface portion F21 of the protruding plate 85A in the Y direction and is not in contact with the rotational shaft member 85.

Figure 47:
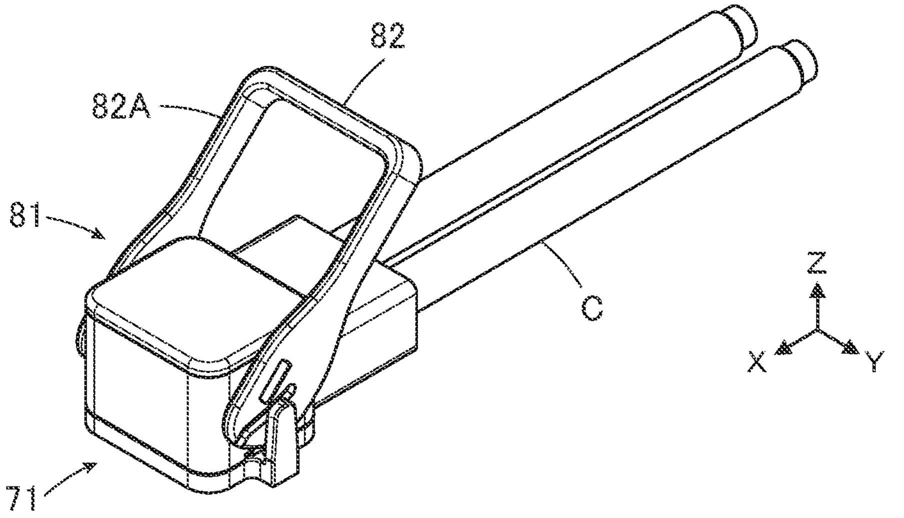
FIG. 47 is a perspective view showing the connector assembly according to Embodiment 4 when the rotation angle of the lever member in the fitting operation is 45 degrees.
Figure 48:
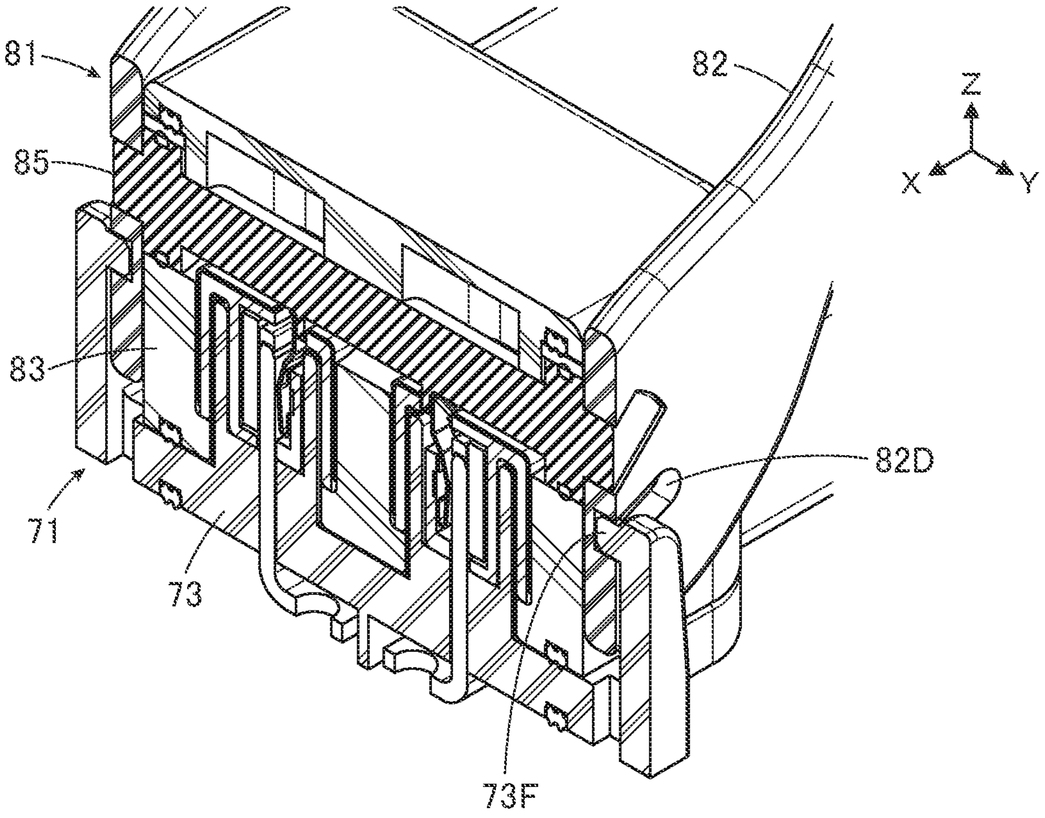
FIG. 48 is a partially broken perspective view showing the connector assembly according to Embodiment 4 when the rotation angle of the lever member in the fitting operation is 45 degrees.

Next, as shown in FIG. 47, when the lever member 82 is rotated till the handle portion 82A is positioned at 45 degrees to the Z direction, as shown in FIG. 48, the pin 73F of the first insulator 73 of the first connector 71 relatively advances along the cam groove 82D of the lever member 82, and the second insulator 83 of the second connector 81 moves in the −Z direction with respect to the first insulator 73 of the first connector 71.

Figure 49:
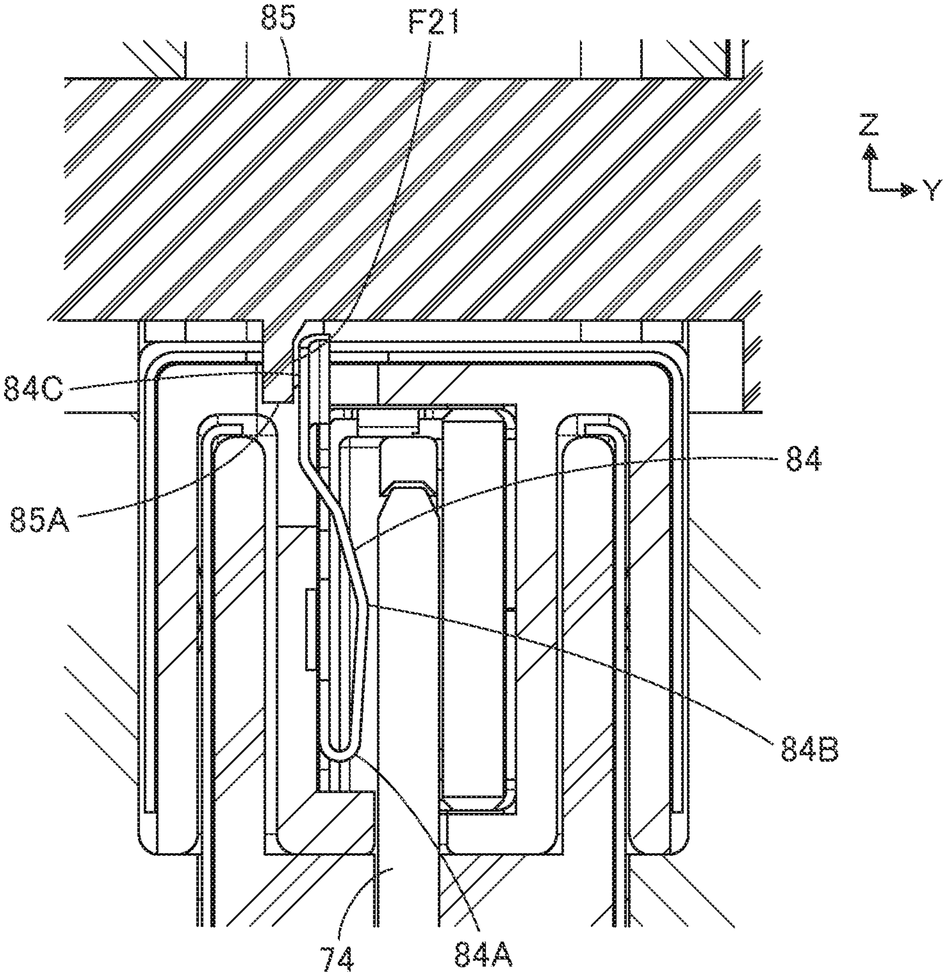
FIG. 49 is an enlarged partial cross-sectional view showing the connector assembly according to Embodiment 4 when the rotation angle of the lever member in the fitting operation is 45 degrees.

Consequently, the contact point portion 84B of the second contact 84 is situated to face a side surface of the first contact 74 of the first connector 71 as shown in FIG. 49. In this state, the Z directional position of the second insulator 83 with respect to the first insulator 73 is defined as "fitting position," and the rotation position of the lever member 82 is defined as "first rotation position."

Figure 50:
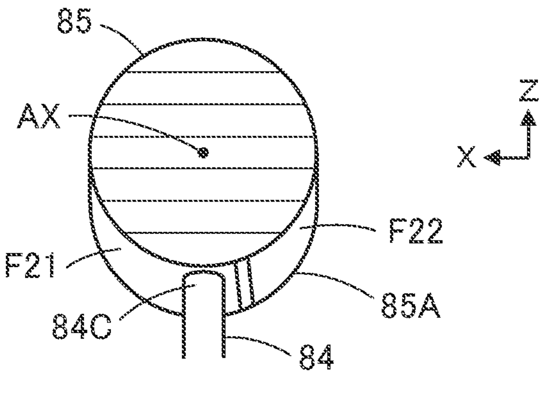
FIG. 50 is a cross-sectional view showing the rotational shaft member used in Embodiment 4 when the rotation angle of the lever member in the fitting operation is 45 degrees.

At this time, in accordance with rotation of the lever member 82, the rotational shaft member 85 also rotates 45 degrees about the rotational axis AX, while the first outer surface portion F21 of the protruding plate 85A still faces the point-of-effort portion 84C, and the point-of-effort portion 84C of the second contact 84 is kept in a non-contact state with the rotational shaft member 85 as shown in FIG. 50.

Figure 51:
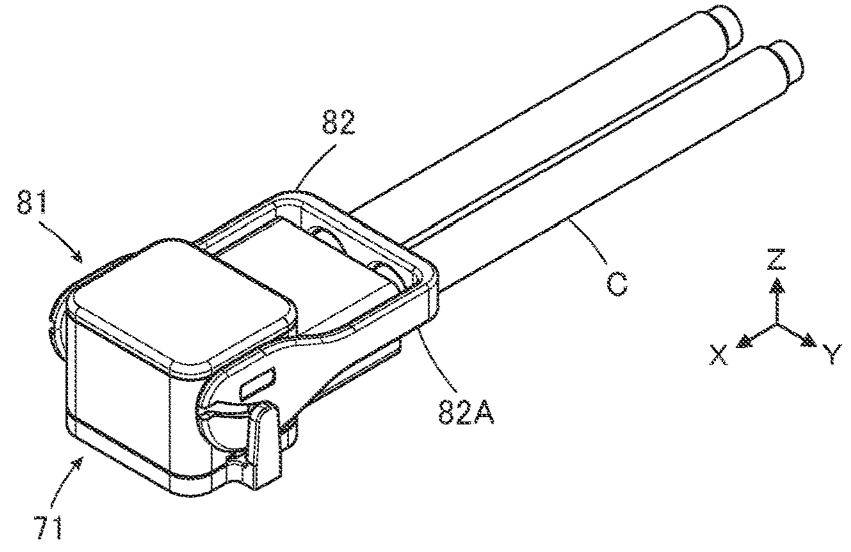
FIG. 51 is a perspective view showing the connector assembly according to Embodiment 4 when the rotation angle of the lever member in the fitting operation is 90 degrees.
Figure 52:
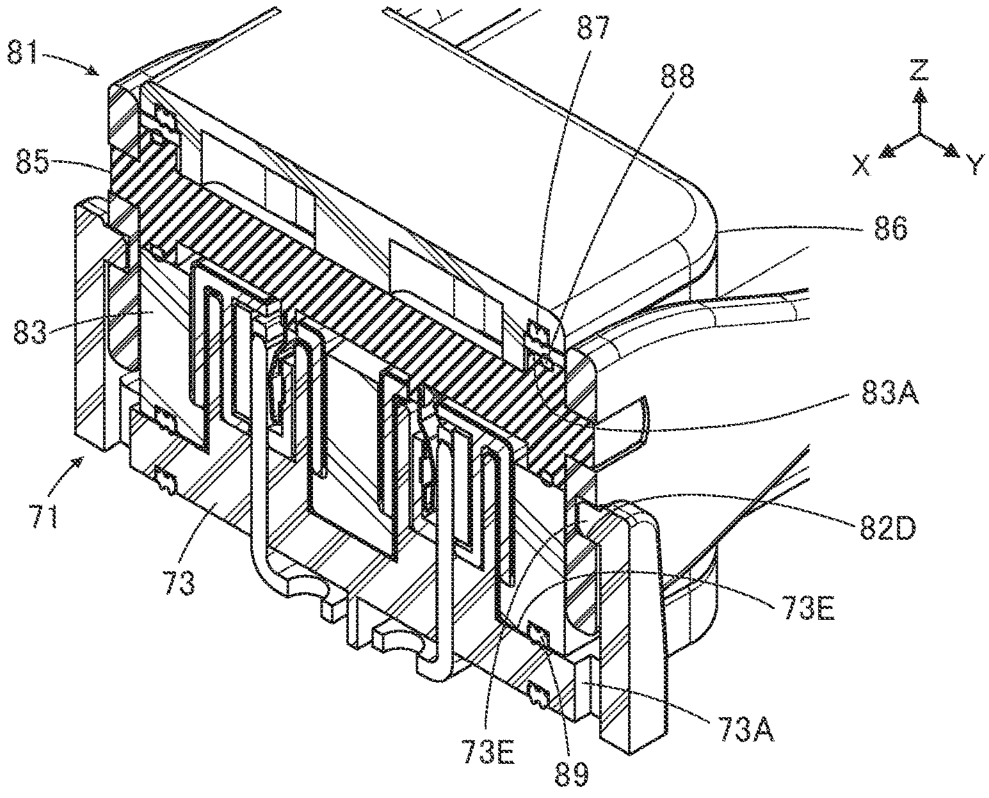
FIG. 52 is a partially broken perspective view showing the connector assembly according to Embodiment 4 when the rotation angle of the lever member in the fitting operation is 90 degrees.

As shown in FIG. 51, when the lever member 82 in this state is rotated till the handle portion 82A is positioned at 90 degrees to the Z direction, as shown in FIG. 52, the pin 73F of the first insulator 73 of the first connector 71 is inserted to the deepest part of the cam groove 82D of the lever member 82, while the Z directional position of the second insulator 83 with respect to the first insulator 73 does not change due to the shape of the cam groove 82D.

Figure 53:
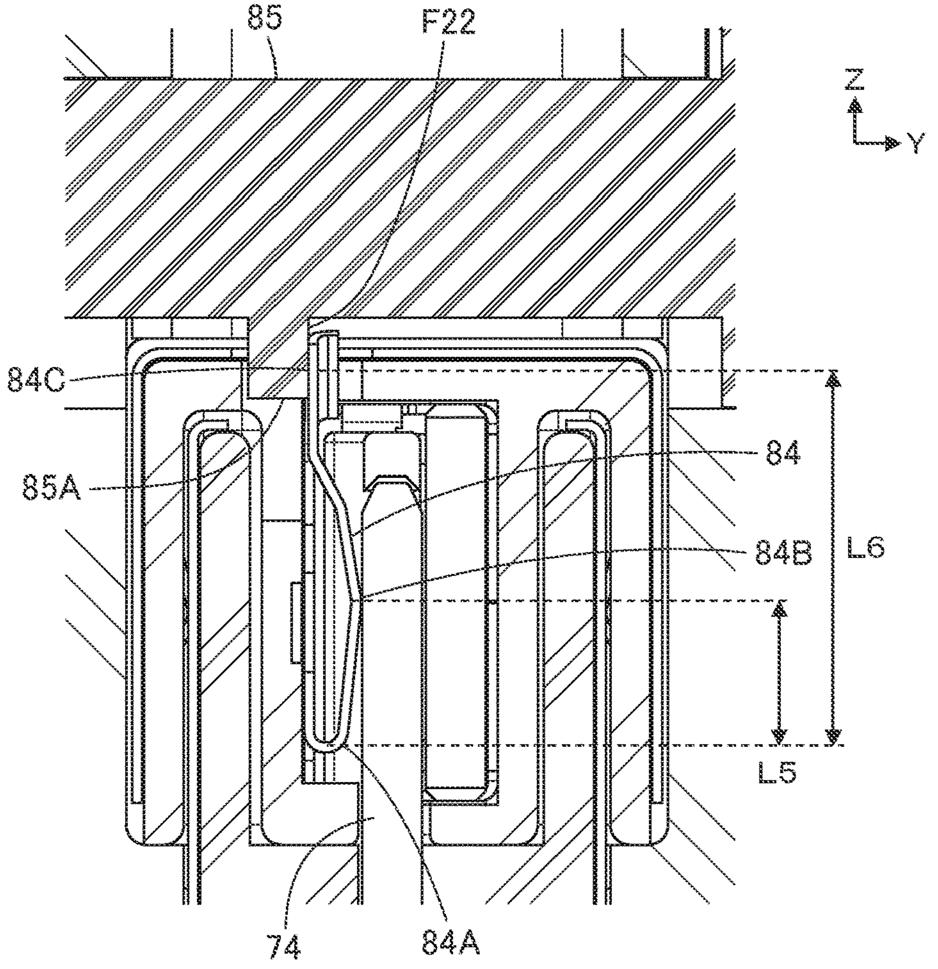
FIG. 53 is an enlarged partial cross-sectional view showing the connector assembly according to Embodiment 4 when the rotation angle of the lever member in the fitting operation is 90 degrees.

Accordingly, as shown in FIG. 53, the second insulator 83 of the second connector 81 is kept to be held at the fitting position with respect to the first insulator 73 of the first connector 71, and the contact point portion 84B of the second contact 84 is kept to face the side surface of the first contact 74 of the first connector 71.

Figure 54:
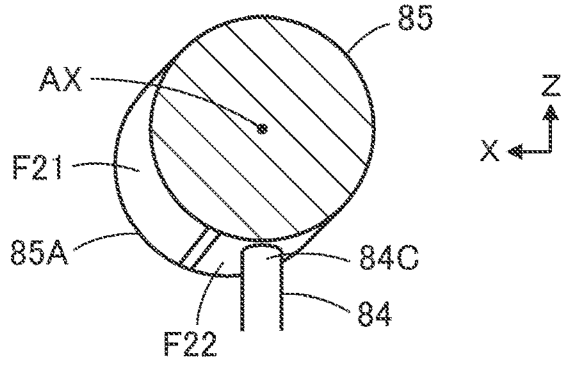
FIG. 54 is a cross-sectional view showing the rotational shaft member used in Embodiment 4 when the rotation angle of the lever member in the fitting operation is 90 degrees.
Figure 55:
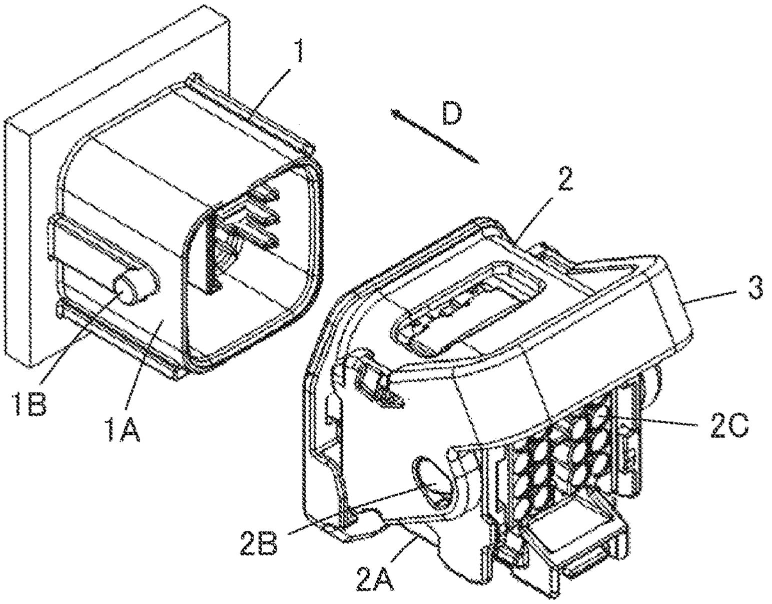
FIG. 55 PRIOR ART
FIG. 55 is a perspective view showing a conventional connector assembly before fitting.
Figure 56:
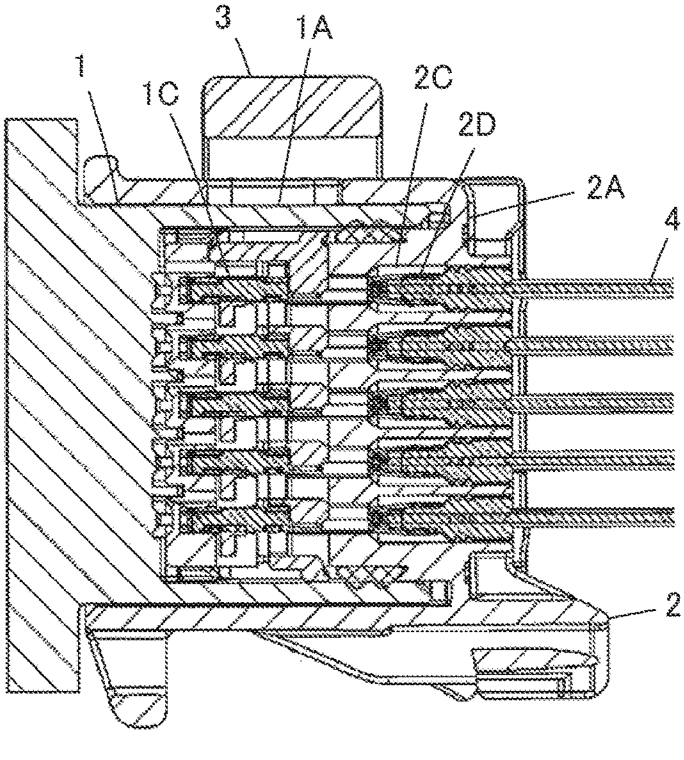
FIG. 56 PRIOR ART
FIG. 56 is a cross-sectional view showing the conventional connector assembly in the fitted state.

Meanwhile, in accordance with rotation of the lever member 82, the rotational shaft member 85 also rotates about the rotational axis AX, and the second outer surface portion F22 of the protruding plate 85A forming the cam surface faces the point-of-effort portion 84C as shown in FIG. 54. Since the second outer surface portion F22 is shifted toward an end portion of the rotational shaft member 85 in the Y direction from the first outer surface portion F21 by the distance T2, the second outer surface portion F22 contacts the point-of-effort portion 84C of the second contact 84 to press the point-of-effort portion 84C in the Y direction.

Since a distance L6 from the fulcrum portion 84A to the point-of-effort portion 84C in the second contact 84 is designed to be longer than a distance L5 from the fulcrum portion 84A to the contact point portion 84B, the so-called principle of leverage works such that the contact point portion 84B receives a force larger than a pressing force the point-of-effort portion 84C receives from the second outer surface portion F22 of the protruding plate 85A of the rotational shaft member 85, whereby the contact point portion 84B of the second contact 84 contacts the first contact 74 with a high contact pressure.

The rotation position of the lever member 82 at this time is defined as "second rotation position."

As described above, by rotating the lever member 82 from the initial rotation position where the handle portion 82A has an angle of zero degrees with respect to the Z direction to the first rotation position where the handle portion 82A has an angle of 45 degrees with respect to the Z direction, the second insulator 83 of the second connector 81 can be moved from the start-of-fitting position to the fitting position with respect to the first insulator 73 of the first connector 71 while the point-of-effort portion 84C of the second contact 84 is not in contact with the rotational shaft member 85, and the first connector 71 and the second connector 81 can be easily fitted to each other with a small insertion force.

Further, by rotating the lever member 82 from the first rotation position to the second rotation position where the handle portion 82A has an angle of 90 degrees with respect to the Z direction, the point-of-effort portion 84C of the second contact 84 is then pressed in the Y direction by the second outer surface portion F22 of the protruding plate 85A of the rotational shaft member 85 while the second insulator 83 of the second connector 81 is kept at the fitting position with respect to the first insulator 73 of the first connector 71, and the contact point portion 84B of the second contact 84 can be brought into contact with the first contact 74 with a high contact pressure.

At this time, since the first contact 74 and the second contact 84 are pressed against each other in the Y direction without rubbing against each other in the Z direction, the first contact 74 and the second contact 84 can be electrically connected to each other while preventing surface damage thereof.

In addition, as shown in FIG. 52, when the second insulator 83 of the second connector 81 is situated at the fitting position with respect to the first insulator 73 of the first connector 71, the fitting-part waterproof packing 89 disposed on the −Z directional front end surface of the second insulator 83 is pressed against the abutment surface 73E of the base portion 73A of the first insulator 73 to thereby seal between the front end surface of the second insulator 83 and the abutment surface 83E.

Moreover, due to the presence of the rotational-axis waterproof packings 88 separately attached to the Y directional opposite end portions of the rotational shaft member 85, a portion between the inner surface of each of the through holes 83A of the second insulator 83 and the outer peripheral surface of the rotational shaft member 85 is sealed.

In addition, the waterproof packing 87 seals between the +Z directional end portion of the second insulator 83 and the lid portion 86.

Accordingly, the connection parts between the first contact 74 and the second contact 84 can be prevented from water infiltration from the outside.

In Embodiments 1 to 4 described above, the initial rotation position, the first rotation position, and the second rotation position of the lever member 22, 32, 62, 82 are defined as positions at which the lever member 22, 32, 62, 82 has rotation angles of zero degrees, 45 degrees, and 90 degrees, respectively, but this is not the sole case, and these positions can be defined as positions with other rotation angles.

What is claimed is:

1. A connector assembly comprising:

a first connector including a first insulator and a first contact, the first contact being held by the first insulator;

a second connector including a second insulator and a second contact and being fitted to the first connector along a fitting direction, the second contact being held by the second insulator;

a lever member held by one of the first insulator and the second insulator in a rotatable manner about a rotational axis:

a rotational shaft member extending along the rotational axis and rotating in accordance with rotation of the lever member, the rotational shaft member including a cam surface for pressing the first contact and the second contact against each other; and a cam mechanism moving the first insulator and the second insulator relatively along the fitting direction in conjunction with rotation of the lever member, wherein, when the lever member is rotated from an initial rotation position to a first rotation position with the second insulator being situated at a start-of-fitting position with respect to the first insulator, the cam mechanism moves the second insulator to a fitting position along the fitting direction, and when the lever member is further rotated from the first rotation position to a second rotation position, the first contact and the second contact are brought into contact with each other with a predetermined contact pressure due to the cam surface of the rotational shaft member while the second insulator is kept at the fitting position.

2. The connector assembly according to claim 1, wherein the lever member is rotatably held by the second insulator, and wherein the cam mechanism includes a cam groove formed in the lever member and a pin that is formed in and protrudes from the first insulator and that is inserted into the cam groove.

3. The connector assembly according to claim 2, wherein the second insulator includes a pair of rotational-shaft-member housing portions separately housing opposite end portions of the rotational shaft member in a rotatable manner, wherein the first insulator includes an abutment surface abutting a front end surface of the second insulator when the second insulator is situated at the fitting position, and wherein the connector comprises a fitting-part waterproof packing disposed at one of the abutment surface of the first insulator and the front end surface of the second insulator and sealing between the abutment surface of the first insulator and the front end surface of the second insulator when the second insulator is situated at the fitting position, and a pair of rotational-axis waterproof packings separately disposed to surround the opposite end portions of the rotational shaft member and each sealing between an outer peripheral surface of one of the opposite end portions of the rotational shaft member and an inner surface of a corresponding one of the pair of rotational-shaft-member housing portions.

4. The connector assembly according to claim 1, wherein the first contact and the second contact each extend along the fitting direction, wherein one of the first contact and the second contact is composed of a spring contact, and another one of the first contact and the second contact is composed of a fixed contact, and wherein the cam surface of the rotational shaft member presses the spring contact toward the fixed contact in a direction intersecting the fitting direction, whereby the first contact and the second contact are brought into contact with each other.

5. The connector assembly according to claim 4, wherein the spring contact includes a point-of-effort portion contacting the cam surface of the rotational shaft member and receiving a pressing force from the cam surface, a fulcrum portion serving as a fulcrum of elastic deformation of the spring contact when the point-of-effort portion receives the pressing force, and a contact point portion disposed between the point-of-effort portion and the fulcrum portion and contacting the fixed contact, and wherein a distance from the fulcrum portion to the point-of-effort portion is longer than a distance from the fulcrum portion to the contact point portion.

6. The connector assembly according to claim 5, wherein the rotational shaft member has a small radius portion and a large radius portion based on a difference in a radius from the rotational axis in a cross section that is orthogonal to the rotational axis, the small radius portion and the large radius portion being adjacently disposed in a circumferential direction, wherein the small radius portion is not in contact with the point-of-effort portion of the spring contact when facing the point-of-effort portion, whereas the large radius portion is in contact with the point-of-effort portion of the spring contact when facing the point-of-effort portion, wherein the cam surface is formed of an outer peripheral cam surface disposed at a surface of the large radius portion, and wherein a surface of the small radius portion faces the point-of-effort portion of the spring contact while the lever member is rotated from the initial rotation position to the first rotation position, and when the lever member is rotated from the first rotation position to the second rotation position, the surface of the large radius portion faces the point-of-effort portion of the spring contact, and the first contact and the second contact are pressed against each other due to the outer peripheral cam surface.

7. The connector assembly according to claim 6, wherein the rotational shaft member is held by the second insulator in a slidable manner along a rotational axial direction of the lever member, wherein the rotational shaft member includes a projection formed at and protruding from an outer periphery, wherein the second insulator includes a projection housing portion of recess shape for housing the projection, and wherein the rotational shaft member is slid with respect to the second insulator so that the projection is housed in the projection housing portion, whereby rotation of the lever member with respect to the second insulator is locked.

8. The connector assembly according to claim 6, wherein the second contact is composed of the spring contact, and wherein, when the lever member is rotated from the first rotation position to the second rotation position, the cam surface contacts the second contact to press the second contact toward the first contact.

9. The connector assembly according to claim 5, wherein the rotational shaft member includes an insertion groove which extends in a circumferential direction along a plane that is orthogonal to the rotational axis and into which the point-of-effort portion of the spring contact is inserted, wherein the insertion groove includes a first side surface portion and a second side surface portion facing in an axial direction along the rotational axis and disposed adjacently to each other in a circumferential direction, wherein the first side surface portion is not in contact with the point-of-effort portion of the spring contact when facing the point-of-effort portion, and the second side surface portion forms the cam surface which is in contact with the point-of-effort portion of the spring contact when facing the point-of-effort portion, and wherein the first side surface portion faces the point-of-effort portion of the spring contact while the lever member is rotated from the initial rotation position to the first rotation position, and when the lever member is rotated from the first rotation position to the second rotation position, the second side surface portion faces the point-of-effort portion of the spring contact, and the first contact and the second contact are pressed against each other due to the cam surface.

10. The connector assembly according to claim 5, wherein the rotational shaft member includes a protruding plate which extends in a circumferential direction along a plane that is orthogonal to the rotational axis and which faces the point-of-effort portion of the spring contact in an axial direction along the rotational axis, wherein the protruding plate includes a first outer surface portion and a second outer surface portion facing in an axial direction along the rotational axis and disposed adjacently to each other in a circumferential direction, wherein the first outer surface portion is not in contact with the point-of-effort portion of the spring contact when facing the point-of-effort portion, and the second outer surface portion forms the cam surface which is in contact with the point-of-effort portion of the spring contact when facing the point-of-effort portion, and wherein the first outer surface portion faces the point-of-effort portion of the spring contact while the lever member is rotated from the initial rotation position to the first rotation position, and when the lever member is rotated from the first rotation position to the second rotation position, the second outer surface portion faces the point-of-effort portion of the spring contact, and the first contact and the second contact are pressed against each other due to the cam surface.

* * * * *